United States Patent
Locke et al.

(10) Patent No.: US 10,556,817 B2
(45) Date of Patent: Feb. 11, 2020

(54) GAS-LIQUID PLASMA AND BIOREACTOR SYSTEM AND METHOD FOR REMEDIATION OF LIQUIDS AND GASES

(71) Applicant: FLORIDA STATE UNIVERSITY RESEARCH FOUNDATION, INC., Tallahassee, FL (US)

(72) Inventors: Bruce R. Locke, Tallahassee, FL (US); Youneng Tang, Tallahassee, FL (US); Robert Wandell, Tallahassee, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 163 days.

(21) Appl. No.: 15/883,563

(22) Filed: Jan. 30, 2018

(65) Prior Publication Data

US 2018/0215639 A1    Aug. 2, 2018

Related U.S. Application Data

(60) Provisional application No. 62/451,958, filed on Jan. 30, 2017.

(51) Int. Cl.
   *C02F 9/00* (2006.01)
   *B01J 19/08* (2006.01)
   (Continued)

(52) U.S. Cl.
   CPC ............... *C02F 9/00* (2013.01); *B01J 19/088* (2013.01); *B01J 19/1825* (2013.01); *C02F 3/34* (2013.01);
   (Continued)

(58) Field of Classification Search
   CPC .............. B01J 19/088; B01J 2219/0805; B01J 2219/0809; B01J 2219/0815;
   (Continued)

(56) References Cited

U.S. PATENT DOCUMENTS

| 1,708,126 A | 4/1929 | Esmarch |
| 2,045,343 A | 6/1936 | Darrah |

(Continued)

FOREIGN PATENT DOCUMENTS

| CA | 1069857 A | 1/1980 |
| GB | 787748 A | 12/1957 |

(Continued)

OTHER PUBLICATIONS

Locke et al., "Elementary chemical and physical phenomena in electrical discharge plasma in gas-liquid environments and in liquids", Plasma Chemistry and Catalysis in Gases and Liquids (2012).

(Continued)

*Primary Examiner* — Lessanework Seifu
(74) *Attorney, Agent, or Firm* — Fox Rothschild LLP

(57) ABSTRACT

A mixture comprising liquid water, a gas and at least one organic compound are injected into a non-thermal gas-liquid plasma discharge reactor to generate a flowing liquid film region with a gas stream flowing alongside. A plasma discharge is propagated along the flowing liquid film region. Water is dissociated and reactive species such as hydroxyl radicals, hydrogen peroxide and nitrogen oxides are formed. The organic compound reacts with the reactive species such as hydroxyl radicals and hydrogen peroxide present in the flowing liquid film region and in the flowing gas stream to produce organic compound dissociation products. At least some organic compound dissociation products and nitrogen oxides are transferred to a bioreactor for further degradation of organic compounds. The nitrogen oxides are used as nutrients for bacteria in the bioreactor. Feedback control of the plasma reactor is based on conditions detected and determined in the biological reactor.

43 Claims, 11 Drawing Sheets

(51) Int. Cl.
    *B01J 19/18*     (2006.01)
    *C02F 3/34*      (2006.01)
    *H05H 1/46*      (2006.01)
    *G05D 7/06*      (2006.01)
    *C02F 103/06*    (2006.01)
    *C02F 101/36*    (2006.01)
    *C02F 101/34*    (2006.01)

(52) U.S. Cl.
    CPC ........ *H05H 1/46* (2013.01); *B01J 2219/0845* (2013.01); *B01J 2219/0869* (2013.01); *B01J 2219/0894* (2013.01); *C02F 2101/34* (2013.01); *C02F 2101/36* (2013.01); *C02F 2103/06* (2013.01); *C02F 2201/002* (2013.01); *C02F 2203/006* (2013.01); *G05D 7/0623* (2013.01); *H05H 2001/466* (2013.01)

(58) Field of Classification Search
    CPC .......... B01J 2219/083; B01J 2219/0869; B01J 2219/0877; B01J 2219/0884; B01J 2219/0896; B01J 2219/0897; B01J 2219/0845; C02F 9/00; C02F 3/34; C02F 2101/36; C02F 2101/34; C02F 2101/32; C02F 2101/30; C02F 2201/002
    See application file for complete search history.

(56) References Cited

U.S. PATENT DOCUMENTS

| | | |
|---|---|---|
| 3,205,162 A | 9/1965 | Maclean |
| 3,497,436 A | 2/1970 | Yates et al. |
| 4,141,715 A | 2/1979 | Wyse et al. |
| 4,297,123 A | 10/1981 | Wyse et al. |
| 4,456,512 A | 6/1984 | Bieler et al. |
| 4,926,001 A | 5/1990 | Alagy et al. |
| 6,228,266 B1 | 5/2001 | Shim |
| 6,909,505 B2 | 6/2005 | Lucas et al. |
| 6,923,890 B2 | 8/2005 | Ricatto et al. |
| 7,378,062 B2 | 5/2008 | Itatani et al. |
| 7,604,719 B2 | 10/2009 | Vanden Bussche et al. |
| 7,919,053 B2 | 4/2011 | Burlica et al. |
| 8,444,924 B2 | 5/2013 | Burlica et al. |
| 9,861,950 B2 | 1/2018 | Locke et al. |
| 2004/0116752 A1 | 6/2004 | Giapis et al. |
| 2006/0060464 A1 | 3/2006 | Chang |
| 2007/0167638 A1 | 7/2007 | Brophy et al. |
| 2008/0286169 A1 | 11/2008 | Meillot et al. |
| 2009/0004074 A1 | 1/2009 | Tonkovich et al. |
| 2009/0297406 A1 | 12/2009 | Okino et al. |
| 2010/0220182 A1 | 9/2010 | Krull et al. |
| 2011/0026657 A1 | 2/2011 | Laberge et al. |
| 2012/0000787 A1 | 1/2012 | Santilli |
| 2016/0102025 A1 | 4/2016 | Nunnally et al. |
| 2017/0021326 A1 | 1/2017 | Locke et al. |

FOREIGN PATENT DOCUMENTS

| | | |
|---|---|---|
| GB | 896113 A | 5/1962 |
| GB | 966406 A | 8/1964 |
| WO | 2012126095 A1 | 9/2012 |
| WO | 2013052548 A2 | 4/2013 |

OTHER PUBLICATIONS

Locke et al., "Review of the methods to form hydrogen peroxide in electrical discharge plasma with liquid water", Plasma Sources Science and Technology (2011) 20: 034006.
Lukes et al., "Aqueous-phase chemistry of electrical discharge plasma in water and in gas-liquid environments", Plasma Chemistry and Catalysis in Gases and Liquids (2012) 1st ed. (ch. 7): 243-308.
Lukes et al., "Biological effects of electrical discharge plasma in water and in gas-liquid environments", Plasma Chemistry and Catalysis in Gases and Liquids (2012) 1st ed. (ch. 8): 309-352.
Malik et al., "Preliminary studies on formation of carbonaceous products by pulsed spark discharges in liquid hydrocarbons", Journal of Electrostatics (2008) 66: 574-577.
Malik et al., "Water purification by electrical discharges", Plasma Sources Science and Technology (2001) 10: 82-91.
Malik et al., "Water purification by plasmas: Which reactors are most energy efficient", Plasma Chemistry and Plasma Processing (2010) 30: 21-31.
Mandelli et al., "Hydrogen peroxide oxygenation of saturated and unsaturated hydrocarbons catalyzed by montmorillonite or aluminum oxide", Catalysis Letters (2009) 132: 235-243.
Monod et al., "Structure-activity relationship for the estimation of OH-oxidation rate constants of aliphatic organic compounds in the aqueous phase: Alkanes, alcohols, organic acids and bases", Atmospheric Environments (2008) 42: 7611-7622.
Mora et al., "Selectivity control in a microwave surface-wave plasma reactor for hydrocarbon conversion", Plasma Processes and Polymers (2011) 8: 709-717.
Nozaki et al., "A single step methane conversion into synthetic fuels using microplasma reactor", Chemical Engineering Journal (2011) 166: 288-293.
Nozaki et al., "Innovative methane conversion technology using atmospheric pressure non-thermal plasma", Journal of the Japan Petroleum Institute (2011) 54: 146-158.
Niozaki et al., "Micro-plasma technology—direct methaneto-m ethanol in extremely confined environment", Natural Gas Conversion VII (2004) 147: 505-510.
Nozaki et al., "Partial oxidation of methane using microscale non-equilibrium plasma reactor", Catalysis Today (2004) 98: 607-616.
Nozaki et al., "Selective conversion of methane to synthetic fuels using dielectric barrier discharge contacting liquid film", Journal of Physics D-Applied Physics (2011) 44.
Okazaki et al., "Direct conversion from methane to methanol for high efficiency energy system with exergy regeneration", Energy Conversion and Management (2002) 43: 1459-1468.
Patino et al., "Oxidation of cycloalkanes and diesel fuels by means of oxygen low pressure plasmas", Energy & Fuels (2002) 16: 1470-1475.
Patino et al., "Upgrading of diesel fuels and mixtures of hydrocarbons by means of oxygen low pressure plasmas: A comparative study", Fuel (2003) 82:1613-1619.
Perevezentsev et al., "Transformations of benzene-argon mixture in barrier discharge", High Energy Chemistry (2011) 45: 62-65.
Prieto et al., "Nonthermal plasma reactors for the production of light hydrocarbon olefins from heavy oil", Brazilian Journal of Chemical Engineering (2003) 20: 57-61.
Prieto et al., "Reforming of heavy oil using nonthermal plasma", IEEE Transaction on Industry Applications (2001) 37: 1464-1467.
Rasmussen et al., "Direct partial oxidation of natural gas to liquid chemicals: Chemical kinetic modeling and global optimization", Industrial & Engineering Chemistry Research (2008) 47: 6579-6588.
Sedelmeier et al., "KMnO4-mediation oxidation as a continuous flow process", Organic Letters (2010) 12: 3618-3621.
Sekiguchi et al., "Direct hydroxylation of benzene using micro plasma reactor", Kagaku Kogaku Ronbunshu (2004) 30: 183-185. (abstract translation).
Shul'Pin et al., "Alkane oxygenation with H2O2 catalysed by FECl3 and 2,2'- bipyridine", Tectrahedron Letters (2005) 46: 4563-4567.
Sivaramakrishnan et al., "Rate constants for OH with selected large alkanes: Shock-tube measurements and an improved group scheme", Journal of Physical Chemistry A (2009) 113: 5047-5060.
Sprengnether et al., "Rate constants of nine C6-C9 alkanes with OH from 230 to 379 K: Chemical tracers for OH", Journal of Physical Chemistry A (2009) 113: 5030-5038.
Sugai et al., "Improvement of efficiency for decomposition of organic compounds in water using pulsed streamer discharge in air with water droplets by increasing residence time", Pulsed Power Conference (2009): 1056-1060.
Suhr et al., "Organic syntheses under plasma conditions", Pure and Applied Chemistry (1974) 39: 395-414.

(56) References Cited

OTHER PUBLICATIONS

Suss-Fink et al., "Alkane oxidation with hydrogen peroxide catalyzed homogeneously by vanadium-containing polyphosphomolybdates", Applied Catalysis A-General (2001) 217: 111-117.
Suzuki et al., "Investigation of a pulse circuit design and pulse condition for the high energy efficiency on water treatment using pulsed power discharge in a water droplet spray", IEEE Transactions on Dielectrics and Electrical Insulation (2011) 18: 1281-1286.
Takale et al., "Oxidation of dihydrazones of diarylacetylenes using sodium periodate", Chemistry Letters (2010) 39: 1279-1280.
Tezuka et al., "Oxidation of aromatic hydrocarbons with oxygen in a radiofrequency plasma", Plasma Chemistry and Plasma Processing (1996) 16:329-340.
Tezuka et al., "Oxidation of cycloalkanes in a radiofrequency plasma", Bulletin of Chemical Society of Japan (1991) 64: 1063-1065.
Thagard et al., "Electrical discharges in polar organic liquids", Plasma Processes and Polymers (2009) 6: 741-750.
Thornton et al., "Hydrazine synthesis in silent electrical discharge", Advances in Chemistry Series (1969): 165.
Thornton et al., "Hydrazine synthesis in silent electrical discharge", Nature (1967) 213: 1118.
Thornton et al., "Synthesis of formaldehyde from methane in electrical discharges", Nature (Feb. 11, 1967) 213: 590-591.
Sergio et al., "Synthesis of formaldehyde from methane and water in an electrical discharge 2-phase reactor", Journal of Applied Chemistry (1967) 17:325.
Wilson et al., "Measurement and estimation of rate constants for the reactions of hydroxyl radical with several alkanes and cycloalkanes", Journal of Physical Chemistry A (2006) 110: 3593-3604.
Yaji Ma et al., "Oxidation reactions of aromatic ethenes in solution exposed to low-temperature oxygen plasma", Journal of Photopolymer Science and Technology (2007) 20: 235-238.
Yamamoto et al., "Wet type plasma reactor for incinerator", Conference Record of the 1998 IEEE Industry Applications Conference (1998) 1-3: 1861-1864.
Jaramillo-Sierra et al, "Degradation of m-cresol in aqueous solution by dielectric barrier discharge," Journal of Physics; Conference Series 406 (2012) 012025.
Rumbach et al, "Decoupling Interfacial Reactions between Plasmas and Liquids: Charge Transfer vs Plasma Neutral Reactions," J. Am. Chem. Soc. 2013, 135, pp. 16264-16267.
Kuroki et al, "Decomposition of Trace Phenol in Solution Using Gas-Liquid Interface Discharge," Japanese J. of Appl. Phys. vol. 45, No. 5A, 2006, pp. 4296-4300.
Ognier et al, "Analysis of Mechanisms at the Plasma-Liquid Interface in a Gas-Liquid Discharge Reactor Used for Treatment of Polluted Water," Plasma Chem. Plasma Process (2009) 29:261-273.
Magureanu et al, "Degradation of pharmaceutical compound pentoxifylline in water by non-thermal plasma treatment," Nater Research 44 (2010) pp. 3445-3453.
Magureanu et al, "Degradation of antibiotics in water by non-thermal plasma treatment," Water Research 45 (2011) pp. 3407-3416.
Lukes et al, "Hydrogen Peroxide and Ozone Formation in Hybrid Gas-Liquid Electrical Discharge Reactors," IEEE Trans. Ind. Appl., vol. 40, No. 1, Jan./Feb. 2004, pp. 60-67.
Locke et al, "Elementary Chemical and Physical Phenomena in Electrical Discharge Plasma in Gas-Liquid Environments and in Liquids," Ch. 6, pp. 185-241 of Plasma Chemistry and Catalysis in Gases and Liquids, 1st ed., Parvulescu et al eds., 2012.
Bresch et al.: "Oxidized Derivatives of n-Hexane from a Water/Argon Continuous Flow Electrical Discharge Plasma Reactor", Plasma Chemistry and Plasma Processing, 35(6) (2015) 553-584.
Hsieh et al.: "Analysis of a gas-liquid film plasma reactor for organic compound oxidation", Journal of Hazardous Materials 317 (2016) 188-197.

Hsieh et al.: "Analysis of hydroxyl radical formation in a gas-liquid electrical discharge plasma reactor utilizing liquid and gaseous radical scavengers", Plasma Processes and Polymers, 14(8) e1600171 (2017).
Ammary, "Nutrients requirements in biological industrial wastewater treatment", African Journal of Biotechnology vol. 3 (4), pp. 236-238, Apr. 2004.
Yang et al.: "Occurrences and removal of pharmaceuticals and personal care products (PPCPs) in drinking water and water/sewage treatment plants: A review", Science of the Total Environment 596-597 (2017) 303-320.
Edward Archer et al.: "The fate of pharmaceuticals and personal care products (PPCPs), endocrine disrupting aontaminants (EDCs), metabolites and illicit drugs in a WWTW and environmental waters", Chemosphere 174 (2017) 437-446.
Deblonde T, Cossu-Leguille C and Hartemann P 2011 Emerging pollutants in wastewater: A review of the literature International Journal of Hygiene and Environmental Health 214 442-8.
Geissen et al.: 2015 Emerging pollutants in the environment: A challenge for water resource management International Soil and Water Conservation Research 3 57-65.
Fujii et al: 2007 New POPs in the water environment: distribution, bioaccumulation and treatment of perfluorinated compounds—a review paper Journal of Water Supply Research and Technology-Aqua 56 313-26.
International Search Report dated Jun. 9, 2015 in International Application No. PCT/US2015/020475.
Gubkin, "Electrolytische Metallabscheidung an der freien Oberflache einer Salzlosung" Ann. Physik (1887) 32: 114.2.
Agiral et al., "Gas-to-liquids process using multi-phase flow, non-thermal plasma microreactor", Chemical Engineering Journal (2011) 167: 560-566.
Akiyama, "Streamer discharges in liquids and their applications", IEEE Transactions on Dielectrics and Electrical Insulation (2000) 7: 646-653.
Bie et al., "Dielectric barriers discharges used for the conversion of greenhouse gases: Modeling the plasma chemistry by fluid simulations", Plasma Sources Science & Technology (2011) 20(2): 024008. (12 pages).
Bie et al., "Fluid modeling of the conversion of methane into higher hydrocarbons in an atmospheric pressure dielectric barrier discharge", Plasma Processes and Polymers (2011) 8: 1033-1058.
Bruggeman et al., "Non-thermal plasmas in and in contact with liquids", Journal of Physics D: Applied Physics (2009) 42: 1-28.
Burlica et al., "Formation of H2 and H2O2 in water-spray gliding arc nonthermal plasma reactor", Industrial & Engineering Chemistry Research (2010) 49(14): 6342-6349.
Burlica et al., "Hydrogen generation by pulsed gliding arc discharge plasma with sprays of alcohol solutions", Industrial & Engineering Chemistry Research (2011) 50: 9466-9470.
Burlica et al., "Pulsed plasma gliding arc discharges with water spray", IEEE Transactions on Industry Applications (2008) 44: 482-489.
Davies et al., "Glow-discharge electrolysis. Part I. The Anodic formation of hydrogen peroxide in inert electrolytes", Journal of the Chemical Society, Faraday Transactions (1952) Sep.: 3595-3602.
Friedrich, "Mechanisms of plasma polymerization—Reviewed from a chemical point of view", Plasma Processes and Polymers (2011) 8: 783-802.
Gambus et al., "Oxidation of long chain hydrocarbons by means of low-pressure plasmas", Energy & Fuels (2001) 15: 881-886.
Gesser et al., "The direct conversion of methane to methanol by controlled oxidation", Chemical Reviews (1985) 85: 235-244.
Goujard et al., "Plasma-assisted partial oxidation of methane at low temperatures: Numerical analysis of gas-phase chemical mechanism", Journal of Physics D-Applied Physics (2011) 44(27): 274011. (13 pages).
Gubkin, "Electrolytische Metallabscheidung an der freien Oberflache einer Salzlosung" Ann. Physik (1887) 32: 114.
Hickling et al., "Contact glow-discharge electrolysis", Transactions of the Faraday Society (1964) 60: 783-793.

(56) References Cited

OTHER PUBLICATIONS

Hickling, "Electrochemical processes in glow discharge at the gas-solution interface", Modem Aspects of Electrochemistry (1971) 6: 329-373.

Hijikata et al., "Methanol conversion from methane and water vapor by electric discharge (effect of electric discharge process on methane conversion)", Heat Transfer Asian Research (1999) 28: 404-417.

Honorato et al., "(1)H low- and high-field NMR study of the effects of plasma treatment on the oil and water fractions in crude heavy oil", Fuel (2012) 92: 62-68.

Hsieh et al., "Optical diagnostics of electrical discharge water-spray reactors for chemical synthesis", IEEE Transactions on Industry Applications (2013) 49: 305-310.

Hueso et al., "Water plasmas for the revalorisation of heavy oils and cokes from petroleum refining", Environmental Science & Technology (2009) 43: 2557-2562.

Indarto, "A review of direct methane conversion to methanol by dielectric barrier discharge", IEEE Transactions on Dielectrics and Electrical Insulation (2008) 15: 1038-1043.

Jannini et al., "Hydrogen peroxide oxidation of alkanes catalyzed by the vanadate ion-pyrazine-2-carboxilic acid system", Petroleum Chemistry (2005) 45: 413-418.

Jia et al., "Catalytic functionalization of arenes and alkanes via C-H bond activation", Accounts of Chemical Research (2001) 34: 633-639.

Kamata et al., "Efficient stereo- and regioselective hydroxylation of alkanes catalysed by a bulky poloxometalate", Nature Chemistry (2010) 2: 478-483.

Khani et al., "Investigation of cracking by cylindrical dielectric barrier discharge reactor on the n-hexadecane as a model compound", IEEE Transactions on Plasma Science (2011) 39: 1807-1813.

Kobayashi et al., "The effect of spraying of water droplets and location of water droplets on the water treatment by pulsed discharge in air", IEEE Transactions on Plasma Science (2010) 38: 2675-2680.

Koslov et al., "The kinetics and mechanisms of cyclohexane oxygenation by hydrogen peroxide catalyzed by a binuclear iron complex", Russian Journal of Physical Chemistry (2003) 77: 575-579.

Kudryashov et al., "Oxidation of hydrocarbons in a barrier discharge reactor", High Energy Chemistry (2000) 34: 112-115.

Kudryashov et al., "Oxidation of hydrocarbons in a bubble plasma reactor", Petroleum Chemistry (2004) 44: 438-440.

Kudryashov et al., "Oxidation of propylene and isobutylene in a reactor with barrier discharge", Russian Journal of Applied Chemistry (2004) 77: 1904-1906.

Kudryashov et al., "Oxidation of propylene with air in barrier discharge in the presence of octane", Russian Journal of Applied Chemistry (2011) 84: 1404-1407.

Kudryashov et al., "Oxidative conversion of cyclohexane in discharge plasma maintained with different high-voltage power sources", High Energy Chemistry (2008) 42: 51-55.

Kudryashov et al., "Simulation of the kinetics of cyclohexane oxidation in a barrier discharge reactor", High Energy Chemistry (2002) 36: 349-353.

Kudryashov et al., "Study of the products of Benzene Transformation in the presence of argon, hydrogen, and propane-butane mixture in barrier discharge", Petroleum Chemistry (2012) 52: 60-64.

Kudryashov et al., "Transformations of n-hexane and cyclohexane by barrier discharge processing in inert gases", High Energy Chemistry (2001) 35: 120-122.

Labinger et al., "Understanding and exploiting C-H bond activation", Nature (2002) 417: 507-514.

Lee et al., "The characteristics of direct hydroxylation of benzene to phenol with molecular oxygen enhanced by pulse DC corona at atmospheric pressure", Plasma Chemistry and Plasma Processing (2003) 23: 519-539.

Locke et al., "Electrohydraulic discharge and nonthermal plasma for water treatment", Industrial & Engineering Chemistry Research (2006) 45:882-905.

Esler, "Concerning Recalcitrant/Refractory Organic Species and Chemical Oxygen Demand (COD) analysis by two different methods: (a) CODCr (the dichromate method) and (b) TiO2/UV photoelectrochemistry (the PeCOD™ method)", Aqua Diagnostic 2008.

Montes-Grajales D et al.: "Occurrence of personal care products as emerging chemicals of concern in water resources: A review" 2017 Science of the Total Environment 595 601-14.

Mompelat S et al. "Occurrence and fate of pharmaceutical products and by-products, from resource to drinking water" 2009 Environment International 35 803-14.

Macedo S et al.: "Methyl-triclosan and triclosan impact embryonic development of Danio rerio and Paracentrotus lividus" 2017 Ecotoxicology 26 482-9.

Khetan S K et al.: "Human pharmaceuticals in the aquatic environment: A challenge to green chemistry Chemical Reviews" 2007 107 2319-64.

Yang Y et al.: "Occurrences and removal of pharmaceuticals and personal care products (PPCPs) in drinking water and water/sewage treatment plants: A review" 2017 Science of the Total Environment 596 303-20.

GAS-LIQUID PLASMA AND BIOREACTOR SYSTEM AND METHOD FOR REMEDIATION OF LIQUIDS AND GASES

CROSS-REFERENCE TO RELATED APPLICATIONS

This application claims priority to U.S. Provisional Patent Application No. 62/451,958 filed Jan. 30, 2017, entitled "Combined Gas-Liquid Plasma And Bioreactor Remediation of Liquids And Gases", the entirety of which is incorporated herein by reference.

FIELD OF THE INVENTION

The present invention relates generally to the treatment of organic contaminants, and more particularly to the degradation of organic contaminants to mineralized products.

BACKGROUND OF THE INVENTION

Human society is releasing an increasing number of types and vast amounts of different complex organic compounds into the natural environment. Of these compounds, the emerging contaminants, those typically not regulated or routinely monitored by government agencies, include a wide range of pharmaceuticals and personal care products (PP-CPs), and other compounds that cannot be degraded or removed in conventional drinking water and wastewater treatment processes. Many of these compounds can have adverse effects on the environment, animal, and human health (e.g., endocrine disruptors), even at low concentrations. For example, widespread release of antibiotics has led to the evolution of antibiotic resistant bacteria which reduce our capability to manage infectious diseases. Such compounds are released into drinking water, ground water, and wastewater from hospitals, water treatment plants, and distributed sources such as septic field and edge agricultural runoff. Many of these compounds are not readily biodegradable, some are highly persistent in the environment, some may accumulate in the food chain, and some may degrade into more hazardous compounds causing further environmental and health issues. Approximately 700 emerging pollutants, including their metabolic and degradation products, are listed in Europe.

The use of continuously flowing non-thermal plasma reactors to generate hydrogen peroxide and to degrade organic compounds has been investigated, and the following applications are incorporated by reference in their entireties: US Publication No. US 2017-0021326 A1 published on Jan. 26, 2017; U.S. Pat. No. 9,861,950 issued on Jan. 9, 2018. Plasma reactors are energy intensive and complete degradation of some organic compounds to mineralized products may not be economically feasible.

Biological reactors offer significant energy efficiency, but require significant residence times, on the order of days or weeks, in order to fully degrade some contaminants. Also, biological reactors are incapable of degrading some toxic organic compounds, or are incapable of completely degrading some organic contaminants to mineralized products. Plasma reactors that only treat liquid contaminants combined with biological reactors are incapable of degrading gas phase contaminants. Such combined systems also are not readily adaptable to changing contaminant composition streams.

A significant groundwater contaminant is 1,4-dioxane (dioxane, $C_4H_8O_2$), which has attracted considerable attention in recent years. Co-contamination of 1,4-dioxane with 1,1,1-trichloroethane (TCA) and/or trichloroethene (TCE) is very common. As a probable human carcinogen and part of the U.S. Environmental Protection Agency (U.S. EPA)'s Unregulated Contaminant Monitoring Rule (UCMR3), U.S. EPA reported that dioxane was detected in about 19% of public water systems as of December 2013. Co-contamination of 1,4-dioxane with 1,1,1-trichloroethane (TCA) and/or trichloroethene (TCE) is common, since 1,4-dioxane was widely used as a stabilizer for chlorinated solvents (particularly TCA). The United States Air Force (USAF) Environmental Restoration Program Information Management System (ERPIMS) contains records for co-contamination of 1,4-dioxane, TCE, and TCA at 5788 groundwater-monitoring wells from 49 installations. It was reported that 94% of the groundwater monitoring wells showing TCE and/or TCA contained 1,4-dioxane. TCA and TCE have been regulated by U.S. EPA at maximum contaminant levels (MCL) of 0.2 and 0.005 mg/L, respectively, in drinking water (U.S. EPA). Several states in the U.S. have established drinking water and groundwater guidelines for 1.4-dioxane at 0.3-I pg/L (U.S. EPA).

Two types of technology—advanced oxidation processes (AOP) and biological processes—have been widely tested to treat dioxane, TCA, or TCE-contaminated groundwater, but their application is very limited due to the high cost of the AOP and slow reaction kinetics of the biological processes. To minimize the disadvantage of AOP and biological processes, a few efforts have been made to pretreat dioxane- or TCE-contaminated groundwater using the commonly used AOPs ($H_2O_2+O_3$; $H_2O_2+UV$ irradiation) to convert the contaminants into readily biodegradable compounds, and then further treat it using biological processes. The combined AOP and biological approach is not effective for TCA treatment due to its saturated molecular structure.

A variety of advanced oxidation processes (AOP) have been reported in the literature to treat 1,4-dioxane, TCE, and TCA. The commonly used processes combine either ozone ($O_3$(aq)) or UV radiation with hydrogen peroxide ($H_2O_2$). Full-scale AOP treatment of dioxane or TCE has been reported in a few cases, however, use of AOP for TCA removal is much less since TCA, a saturated molecule, is much more difficult to oxidize than TCE. A comparison study showed that the amount of energy required to decompose TCA is 20-25 times higher than the energy required to decompose the same amount of TCE in a commonly used AOP. The primary limitation with the advanced oxidation processes is their energy intensive nature and high operation and maintenance costs. Most of the energy is used to completely mineralize the intermediates. Therefore, the majority of the energy is used to further remove the intermediates.

Compared to advanced oxidation processes, biological processes are generally much less expensive, but require much longer treatment time. The reported half-lives for dioxane, TCA, and TCE undergoing biodegradation in groundwater and surface water range from months to years.

The biodegradation rate of dioxane is very small due to the small maximum growth rate of the dioxane-degrading bacteria and the large half-maximum-rate constant of dioxane. The concentration of dioxane in groundwater is usually orders of magnitude smaller than the half-maximum-rate concentration of dioxane in Monod kinetics, leading to very small removal rate of dioxane. Therefore, to remove dioxane to below the drinking water guidelines (i.e., 0.3-1 µg/L), a very long treatment time is usually needed.

Current experimental data suggest that dioxane can only be biologically removed under aerobic conditions. Under aerobic conditions, TCA and TCE can be biologically oxidized to $CO_2$, $H_2O$, and $Cl^-$ (chloride) through a co-metabolic pathway. In the aerobic case, the organisms grow on another substrate (i.e., a primary substrate such as methane, ethene, propane and acetate) and the enzymes induced under the particular growth conditions fortuitously biodegrade TCA and TCE. The co-metabolic degradation rate is usually very slow, leading to a long treatment time.

SUMMARY OF THE INVENTION

A method for degrading organic compounds includes the step of injecting a mixture comprising liquid water, a gas and at least one organic compound to contact at least one electrically-conductive inlet electrode of a continuously-flowing non-thermal plasma reactor to generate a flowing liquid film region on one or more internal walls of the continuously-flowing non-thermal plasma reactor with a gas stream flowing alongside the flowing liquid film region. A plasma discharge is propagated along the flowing liquid film region from the at least one electrically-conductive inlet electrode to at least one electrically-conductive outlet electrode at an opposing end of the continuously-flowing plasma reactor. Water and nitrogen-containing gas, and, if present, oxygen gas in the plasma discharge are dissociated to form a plurality of dissociation products, and hydroxyl radicals, hydrogen peroxide and nitrogen oxides are produced from the plurality of dissociation products. Some hydroxyl radicals, hydrogen peroxide and the nitrogen oxides dissolve into the flowing liquid film region. The hydroxyl radicals contact the organic compound present in the flowing liquid film region and in the flowing gas stream to produce organic compound dissociation products. At least some organic compound dissociation products and nitrogen oxides are transferred to a bioreactor. The nitrogen oxide concentration entering the bioreactor is detected. The demand for nitrogen oxides as a nutrient for cell metabolism in the bioreactor is determined. A feedback loop is used to control the production of nitrogen oxides in the plasma reactor based upon the sensed nitrogen oxide concentration and the determined demand for nitrogen oxides entering the bioreactor. At least some of the organic compound dissociation products are converted in the bioreactor into mineralized bioreactor products.

The at least one conductive inlet electrode and the at least one outlet electrode can be capillary tube electrodes, and the plasma reactor can be tubular. The electrically-conductive inlet capillary tube electrode can have a first internal diameter, the tubular plasma reactor can have a second internal diameter, and the electrically conductive outlet capillary tube electrode can have a third internal diameter. The third internal diameter can be larger than the first internal diameter and smaller than the second internal diameter.

The gas can comprise at least one selected from the group consisting of a diatomic gas, a noble gas, and combinations thereof. The diatomic gas can be at least one selected from the group consisting of nitrogen, and oxygen. The noble gas can be at least one selected from the group consisting of helium and argon, and combinations thereof.

The organic compounds can include 1,4-dioxane and at least one selected from the group consisting of trichloroethane (TCA) and trichloroethene (TCE). The organic compound can be at least one selected from the group consisting of an alkane, an alkene, an alkyne, an aromatic hydrocarbon, and combinations thereof. The alkane structure can be at least one selected from the group consisting of linear, cyclic, branched, and combinations thereof. The alkene structure can be at least one selected from the group consisting of linear, cyclic, branched, and combinations thereof.

The alkane can be a C1-C20 alkane. The alkane can be at least one selected from the group consisting of methane, ethane, propane, butane, hexane, octane, decane, icosane, isomers thereof, and combinations thereof. The alkene can be a C2-C20 alkene. The alkene can be at least one selected from the group consisting of ethylene, propylene, butane, pentene, hexenes, octenes, decenes, pentadecenes and combinations thereof. The alkyne can be a C2-C20 alkyne. The aromatic hydrocarbon can include from 6 to 20 carbon atoms. The aromatic hydrocarbon can be at least one selected from the group consisting of benzene, toluene, ethylbenzene, xylenes, cumene, biphenyl, naphthalene, anthracene, chlorinated organics, and combinations thereof.

The mixture can be injected into a plurality of electrically-conductive inlet capillary tubes. The flowing liquid film region can have an annular shape. The plasma discharge can have a frequency of from about 1 to 100,000 Hz. The method can include the step of reducing the hydrogen peroxide concentration entering the bioreactor in a post plasma reactor. The feedback loop can control at least one selected from the group consisting of the flow rate of water, the flow rate of gas, the flow rate of organic compound, and the plasma discharge parameters.

The organic compound dissociation product can include at least one selected from the group consisting of methanol, ethanol, propanol, ethanal, propanal, formic acid, acetic acid, propanoic acid, butanoic acid, pentanoic acid, glycolic acid, oxalic acid, methoxyacetic acid, and sodium formate.

The controlling step can include controlling at least one selected from the group consisting of gas flow rate, gas composition, gas and liquid residence times in the plasma reactor, applied voltage, pulse frequency, pulse width, and rise time. The method can include using at least two plasma reactors operating in parallel, and controlling each plasma reactor independently relative to the other plasma reactor.

The gas injected into one of the plasma reactors can include nitrogen, and the gas injected into the other of the plasma reactors can include a noble gas and be without nitrogen. The method further includes the step of controlling the plasma reactor receiving nitrogen to control nitrogen oxide production, while controlling the plasma reactor receiving the noble gas to control hydrogen peroxide production without nitrogen oxide production.

The determining step can include determining at least one selected from the group consisting of the chemical oxygen demand and the dissolved organic carbon in the bioreactor. The determining step can include determining the ratio of chemical oxygen demand to total nitrogen in the bioreactor. The nitrogen oxide concentration entering the bioreactor can be detected.

A reactor system includes a continuously-flowing non-thermal plasma reactor comprising at least one internal wall, at least one electrically-conductive inlet electrode at one end of the internal wall, and at least one electrically-conductive outlet electrode at an opposing end of the plasma reactor. The electrically-conductive inlet electrode can be configured to inject a mixture comprising a liquid, a gas and at least one organic compound into the plasma reactor. The injecting of the liquid and gas generates a continuously flowing liquid film region on the internal wall, and a gas stream flows along the flowing liquid film region. The injecting further propagates a plasma discharge channel pattern along the interface between the flowing liquid film region and the flowing gas stream inside the plasma reactor. The plasma discharge is propagated along the flowing liquid film region from the at least one electrically-conductive inlet electrode to the at least one electrically-conductive outlet electrode at an opposing end of the continuously-flowing plasma reactor. A power source is provided for supplying a voltage across the at least one electrically-conductive inlet electrode and the at least one electrically-conductive outlet electrode. The reactor dissociates at least a portion of the liquid at the interface with the plasma discharge to form a plurality of dissociation products, and hydroxyl radicals, hydrogen peroxide and nitrogen oxides are produced from the plurality of dissociation products. The hydroxyl radicals are contacted with the organic compounds present in the flowing liquid film region and in the flowing gas stream to produce organic compound dissociation products. The hydrogen peroxide and nitrogen oxides and organic compound dissociation products in both the flowing liquid film region and the flowing gas stream flow to the electrically conductive outlet electrode.

A bioreactor receives the nitrogen oxides and/or hydrogen peroxide if desired with the dissociation products and organic compound dissociation products and converts the organic compound dissociation products to bioreactor products. A detector can be provided for detecting nitrogen oxide content in the bioreactor. A nitrogen oxide demand system can be provided for determining nitrogen oxide demand in the bioreactor. The nitrogen oxides provide elemental nitrogen as a nutrient essential for the bioreactor cells.

A feedback loop controller system controls the production of nitrogen oxides in the plasma reactor based upon the nitrogen oxide demand in the bioreactor and the nitrogen oxide content in the bioreactor.

The power supply coupled to a pulse forming network, provides a high voltage pulse between at least one electrically-conductive inlet electrode and the at least one electrically-conductive outlet electrode. The power supply can be an AC or DC source. The pulse forming network utilizes the input from the power supply to create the high voltage pulse. When the high voltage pulse is applied to the electrodes, a plasma channel is formed allowing current to flow from the cathode to the anode through the plasma channel.

A post plasma reactor can be provided for reducing the hydrogen peroxide concentration entering the bioreactor. The post plasma reactor can also generate hydroxyl radicals which will further react with organic compounds present in the liquid in the post plasma reactor. The bioreactor can be an aerobic activated carbon bioreactor.

The feedback loop controller system controls at least one selected from the group consisting of the flow rate of water, the flow rate of gas, gas composition, the flow rate of organic compound, and the applied voltage, pulse width, pulse rise time, and pulse frequency in the plasma reactor.

The reactor system can include at least two plasma reactors operating in parallel. Each plasma reactor can be independently controllable relative to the other plasma reactor. The gas injected into one of the plasma reactors can include nitrogen, and the gas injected into the other of the plasma reactors can include a noble gas and is without nitrogen. The feedback controller controls the plasma reactor receiving nitrogen to control nitrogen oxide production, while controlling the plasma reactor receiving the noble gas to control hydrogen peroxide production.

The nitrogen oxide demand system can include at least one selected from the group consisting of the chemical oxygen demand detector and a dissolved organic carbon detector. The feedback loop controller system can include a processor for determining the ratio of chemical oxygen demand to total nitrogen in the bioreactor. The processor can have stored in memory a ratio set point for controlling the plasma reactor responsive to whether the ratio of chemical oxygen demand to total nitrogen in the bioreactor is above or below the set point.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1A:
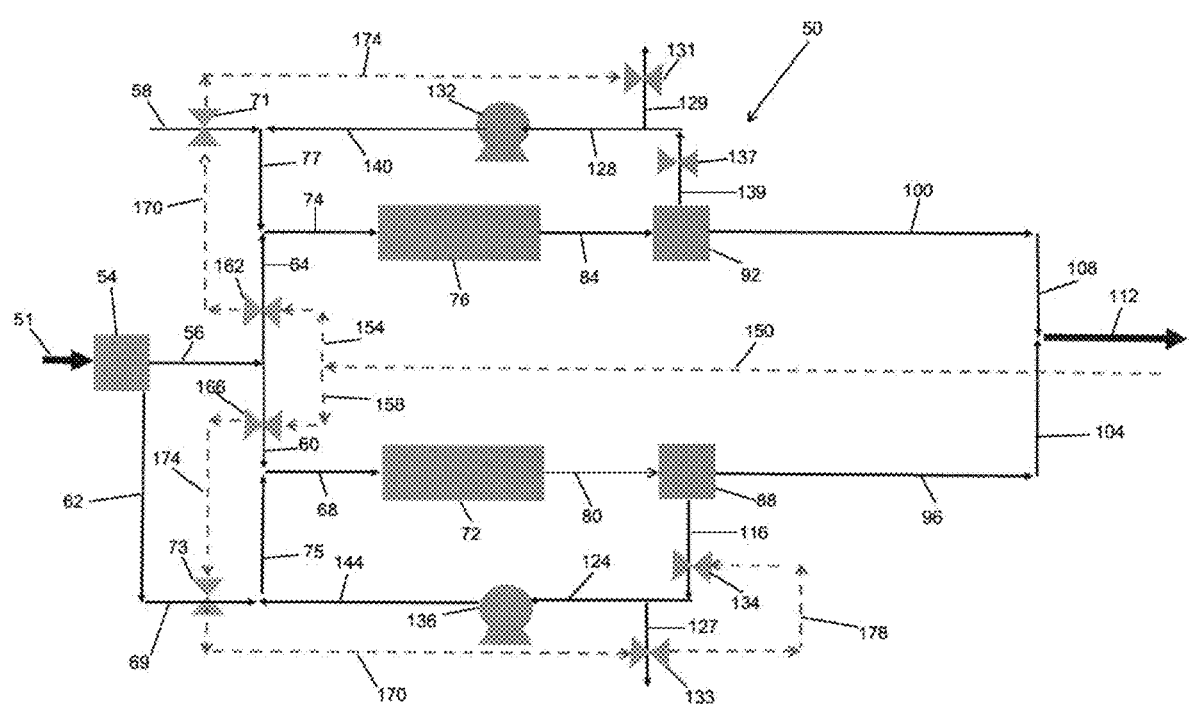
FIG. 1A is a schematic diagram of a first part of a process according to the invention.

A method for degrading organic compounds according to the invention includes the step of injecting a mixture comprising liquid water, a gas and at least one organic compound to contact at least one electrically-conductive inlet electrode of a continuously-flowing plasma reactor to generate a flowing liquid film region on one or more internal walls of the continuously-flowing non-thermal plasma reactor with a gas stream flowing alongside the flowing liquid film region. A plasma discharge is propagated along the flowing liquid film region from the at least one electrically-conductive inlet electrode to at least one electrically-conductive outlet electrode at an opposing end of the continuously-flowing plasma reactor. Water and nitrogen-containing gas are dissociated in the plasma discharge to form a plurality of dissociation products. The plasma reactor produces hydroxyl radicals, hydrogen peroxide and nitrogen oxides from the plurality of dissociation products.

The hydroxyl radicals, hydrogen peroxide and the nitrogen oxides dissolve into the flowing liquid film region and enter the flowing gas stream. The hydrogen peroxide and nitrates and nitrites will preferentially transfer into the liquid. The hydroxyl radicals transferred into the flowing gas stream react with organic compounds in the flowing gas stream, some of which can have limited solubility in the liquid. The organic compound reacts with hydroxyl radicals and hydrogen peroxide present in the flowing liquid film region and in the flowing gas stream to produce organic compound dissociation products. At least some organic compound dissociation products and nitrogen oxides are transferred to a bioreactor. Many different nitrogen oxides can be formed, including without limitation NO, $NO_2$, $N_2O_5$, $N_2O$, nitrite ($NO_2^-$) and nitrate ($NO_3^-$). The bioreactor converts at least some of the organic compound dissociation products into mineralized bioreactor products in the bioreactor. The nitrogen oxides that are produced in the plasma reactor become a nutrient source for organisms in the bioreactor.

The nitrogen oxides ($NO_x$) concentration at the bioreactor can be detected. Nitrites and nitrates are nitrogen compounds that are very soluble in the liquid phase. The demand for nitrogen oxides in the bioreactor can be determined. A feedback loop can be used to control the production of nitrogen oxides in the plasma reactor based upon the detected nitrogen oxide concentration and the determined demand for nitrogen oxides in the bioreactor.

The gas comprises at least one selected from the group consisting of a diatomic gas, a noble gas, and combinations thereof. The diatomic gas is at least one selected from the group consisting of nitrogen, oxygen, and combinations thereof. The noble gas is at least one selected from the group consisting of helium, argon, and combinations thereof. Air can be used as the gas or as part of the gas. Multiple plasma reactors can be used and connected in parallel and can have different gas sources. This can be used to adapt the system to different contaminant stream compositions, and/or to conditions in the bioreactor or other parts of the system.

A continuously-flowing non-thermal plasma reactor comprises at least one internal wall, at least one electrically-conductive inlet electrode at one end of the internal wall, and at least one electrically-conductive outlet electrode at an opposing end of the plasma reactor. The electrically-conductive inlet electrode can be configured to inject a mixture comprising a liquid, a gas and at least one organic compound into the plasma reactor. The injecting of the liquid and gas generates a continuously flowing liquid film region on the internal wall, and a gas stream flowing along the flowing liquid film region. A plasma discharge channel propagates along the interface between the flowing liquid film region and the flowing gas stream inside the plasma reactor. The plasma discharge propagates along the flowing liquid film region from the at least one electrically-conductive inlet electrode to the at least one electrically-conductive outlet electrode at an opposing end of the continuously-flowing plasma reactor.

The electrodes and the plasma reactor can have a number of different designs, sizes and geometries. For example, the plasma reactor can be rectangular, so long as a flowing liquid film and a gas region are created, and the plasma propagates along the flowing liquid film region. In one embodiment, the at least one conductive inlet electrode and the at least one outlet electrode are capillary tube electrodes, and the plasma reactor is tubular. The electrically-conductive inlet capillary tube electrode has a first internal diameter, the tubular plasma reactor has a second internal diameter, and the electrically conductive outlet capillary tube electrode has a third internal diameter, the third internal diameter being larger than the first internal diameter and smaller than the second internal diameter. The contaminant mixture is injected into the tubular reactor, and the flowing liquid film region has an annular shape.

The liquid water, gas and organic compound mixture exiting the inlet capillary tube electrode enters the plasma reactor as a radial spray and contacts the internal wall of the tubular plasma reactor to form a liquid film and a high velocity gas flow region in the plasma reactor.

The power supply coupled to a pulse forming network provides a pulsed plasma discharge between the at least one electrically-conductive inlet electrode and the at least one electrically-conductive outlet electrode. The pulse forming network provides high voltage pulses to the electrodes with a short (1 ms or less) pulse width. The power supply can be an AC or DC source. Current flows through the discharge region when a plasma channel has been formed during the pulse. The plasma discharge has a frequency of from about 1 to 100,000 Hz. Higher frequency results in higher total power which can improve production rates in the plasma reactor, and thereby control of the frequency can be used to control chemical output from the plasma reactor. Total power is dependent on pulse energy and pulse frequency. Energy in a single pulse is the integral of voltage times current for the entire pulse width. Excessive energy per pulse will vaporize a significant amount of liquid and interfere with efficient production of hydroxyl radicals and hydrogen peroxide in the plasma reactor. The energy per pulse can be from 0.01 to 100 millijoules (mJ), or from 0.1 to 10 mJ.

The plasma reactor dissociates at least a portion of the water at the interface with the plasma discharge to form a plurality of dissociation products, and produces hydroxyl radicals, hydrogen peroxide and nitrogen oxides from the plurality of dissociation products, and contacts the hydroxyl radicals and hydrogen peroxide with the organic compounds present in the flowing liquid film region and in the flowing gas stream to produce organic compound dissociation products. The electrodes foster the creation of plasma propagation channels of threads or filaments of the plasma throughout the liquid/gas interface. These threads or filaments are rapidly created and rapidly dissipate and appear individually. The spatial location of each successive plasma channel varies on the gas/liquid interface so that over a period of time (depending on pulse frequency) the entirety of the gas/liquid interface will have had contact with a plasma channel.

A bioreactor is provided for receiving the dissociation products and organic compound dissociation products and further breaking down the organic compound dissociation products to bioreactor products and particularly mineralized products. The biological reactor can have different designs which will retain the organisms and provide significant contact between the liquid and the organisms. The biological reactor preferably provides high surface area for enabling contact between the biological organisms and the organic compound dissociation products. The design of the bioreactor can be varied depending on throughput and the organic compound dissociation products to be treated. The bioreactor can be anaerobic or aerobic, depending on the nature of the organic compound dissociation products and the organisms needed to degrade these products. A porous or high surface area packing material in the biological reactor can be used to retain the biological organisms, and possibly also to absorb and store the organic compound until the organism can degrade it. In one embodiment, the bioreactor is an aerobic activated carbon bioreactor.

A high surface area biological activated carbon (BAC) reactor can be used to aerobically oxidize the intermediates and dioxane, TCE, and TCA that exit the non-thermal plasma reactor. The aerobic process works for dioxane, TCE, and TCA simultaneously and it has faster degradation kinetics compared to the anaerobic process. A BAC reactor facilitates four complementary factors. First, activated carbon can adsorb dioxane, TCA, and TCE, which concentrates the contaminants for the biofilm to degrade it at a later time; this is especially valuable if the contaminant loading varies over time. Second, many sites contaminated by TCE and/or TCA are being treated using granular activated carbon (GAC) adsorption through pump-and-treat. The GAC adsorbers in such sites may be retrofitted to be a BAC reactor. Third, BAC is especially advantageous because of its ability to retain the slow growing microorganisms that remove dioxane, TCE, TCA, and their daughter products. Finally, the adsorptive capacity of BAC also can flatten out surges of contaminants, should any break through the HLGDR due to loading variability.

The biological organisms can be specifically selected for the organic compound dissociation products that must be treated. It is also possible to seed the biological reactor with a sludge or other composition containing many different microorganisms. The biological organisms will self-select depending on the organic compound dissociation products and the conditions in the bioreactor, for example aerobic or anaerobic.

The hydrogen peroxide concentration entering the bioreactor can be reduced in a post plasma reactor if necessary to enhance biological activity. The hydrogen peroxide concentration can affect performance in the bioreactor and can adversely affect the biological organisms therein. The post plasma reactor can be a storage tank which will hold the liquid leaving the plasma reactor for a residence time selected to allow the hydrogen peroxide to disassociate to desired levels for the bioreactor. The post plasma reactor can include a suitable catalyst such as one containing iron (Fe) to facilitate the dissociation of the hydrogen peroxide and reduce the necessary residence time. Reduction in hydrogen peroxide by the catalyst can generate additional hydroxyl radicals which can further react with the organic compounds in the liquid in the post plasma reactor.

Nitrogen oxides are produced in the plasma reactor and are transported to the bioreactor. Nitrogen oxides are a nutrient for many biological organisms, and thus the nitrogen oxides concentration can be used to facilitate or inhibit growth of the biological organisms. An excess of nitrogen oxides will cause the release of nitrogen oxides and particularly nitrates from the system which can be a pollutant. Insufficient bioavailable nitrogen will inhibit growth of the biological organisms and appropriate degradation of the organic compound dissociation products. A feedback loop controller system is preferably provided for controlling the production of nitrogen oxides in the plasma reactor based upon the nitrogen oxide demand in the bioreactor and the nitrogen oxide content in the bioreactor. The feedback loop controls can control a number of system parameters. In one embodiment, the feedback loop controls at least one selected from the group consisting of the flow rate of water, the flow rate of gas, the flow rate of organic compounds, gas composition, gas and liquid residence times in the plasma reactor, applied voltage, pulse width, pulse rise time, and pulse frequency in the plasma reactor.

The reactor system can comprise multiple plasma reactors, for example two plasma reactors operating in parallel. Each plasma reactor can be independently controllable relative to the other plasma reactor. The gas injected into one of the plasma reactors can for example comprise nitrogen, and the gas injected into the other of the plasma reactors can comprise a noble gas and can be without nitrogen. The feedback controller controls the plasma reactor receiving nitrogen to control nitrogen oxide production, while also controlling the plasma reactor receiving the noble gas to control hydrogen peroxide and hydroxyl radical production. Each can be controlled relative to the other by a suitable processor depending on conditions in the bioreactor. Other gas combinations are possible.

The determination of the demand for nitrogen oxides can be related to the chemical oxygen demand and the dissolved organic carbon in the bioreactor. Detectors for both chemical oxygen demand and dissolved organic carbon are known and commercially available. Examples include LAR's COD analyzer QuickCODultra by LAR Process Analysers AG (Berlin, Germany); PeCOD P100 Online COD—Chemical Oxygen Demand Analyser by Camlab Ltd (Cambridge, United Kingdom); TOC, COD and SAC analyzers by Endress+Hauser AG (Reinach BL, Switzerland); and SOWA COD200Mn by Istek, Inc. (Seoul, Korea).

A variety of detectors can be used to determine the nitrogen oxides in or entering the biological reactor. Total nitrogen sensors as well as methods to measure nitrates and nitrites in solution are commercially available. Examples are TONI® On-line Total Nitrogen Analyzer by AppliTek (Nazareth, Belgium) and Online TN Analyzer—HATN-4000 by ISME (Selangor, Malaysia). Ion chromatography is often used to measure nitrate and nitrite in liquid solutions.

The feedback control can include determining the ratio of chemical oxygen demand to total nitrogen in the bioreactor. This ratio is significant for the viability of the biological organisms. While this number can change based upon the operating parameters of the system, for aerobic organisms this ratio is about 100:5. The ratio that is used as a set point can change depending on the operating characteristics and desired output of the system.

The feedback loop controller system comprises a processor for determining the ratio of chemical oxygen demand to total nitrogen in the bioreactor. Any suitable processor can be utilized. The processor can have or have access to a memory, and stored in memory can be a ratio set point for controlling the plasma reactor responsive to whether the ratio of chemical oxygen demand to total nitrogen in the bioreactor is above or below the set point. If the ratio is too high more nitrogen oxides are necessary, and if the ratio is too low the production of nitrogen oxides should be reduced. The processor will generate suitable control signals which can be used to control valves, switches and other system devices to control operation of the system.

The organic compound can be any of a wide variety of organic compounds, including for example alkanes, alkene, alkyne, aromatic hydrocarbon, and halogenated alkenes, alkynes, and alkanes, and combinations thereof.

The alkane structure is at least one selected from the group consisting of linear, cyclic, branched, and combinations thereof. The alkane can be a C1-C20 alkane. The alkane is at least one selected from the group consisting of methane, ethane, propane, butane, hexane, octane, decane, icosane, isomers thereof, and combinations thereof.

The alkene structure is at least one selected from the group consisting of linear, cyclic, branched, and combinations thereof. The alkene is a C2-C20 alkene. The alkene can comprise at least one selected from the group consisting of ethylene, propylene, butane, pentene, hexenes, octenes, decenes, pentadecenes and combinations thereof.

The alkyne can be a C2-C20 alkyne. The aromatic hydrocarbon can comprise from 6 to 20 carbon atoms. The aromatic hydrocarbon can be at least one selected from the group consisting of benzene, toluene, ethylbenzene, xylenes, cumene, biphenyl, naphthalene, anthracene, chlorinated organics, and combinations thereof.

There are a multitude of possible emerging organic contaminants that could be treated with the systems and methods of the invention. Examples, without limitation, include parabens (preservatives) (Methylparaben, Propylparaben); Anti-epileptic (Carbamazepine); UV filters (Benzophenone, Benzophenone); Diabetes (Gliclazide, Metformin); Plasticizer (Bisphenol-A); Hypertensions (Irbesartan, Valsartan); Antibiotics (Azithromycin, Clarithromycin, Sulfamethoxazole, Sulfasalazine, Trimethoprim, Penicillin, Levofloxicin); Hormones (Estriol, Estrone, Estradiol); Anti-depressants (Fluoxetine, Venlafaxine, Desvenlafaxine); Non-steroidal anti-inflamatory drugs (Acetaminophen, Diclofenac, Ibuprofen, Ketoprofen, Naproxen, Analgaesics, Codeine, Tramadol); Lipid regulators (Atorvostatin, Bezafibrate); Stimulants (Amphetamine); Antihistamine (Fexofenadine); Human indicators (Nicotine); Sunscreens; and Insect repellants.

Examples of other toxic and hazardous contaminants include, Herbicides/pesticides, Organochlorines (chlorinated biphenyls, chlorinated dioxins, DDT, etc.); Triazine herbicides (atrazine, simazine); and chemical agents, including organophosphorous and sulfur agents (VX, Sarin, etc.)

It is possible to determine candidate compounds based upon susceptibility of the compound to oxidation. Compounds can be separated into groups based upon susceptibility to oxidation by a conventional COD (chromate—oxidation by potassium chromate) test—and theoretical oxygen demand ThOD (based upon chemical formula). The ratio of COD/ThOD is significant and lower values mean that the compound is less easily oxidized.

The organic compound dissociation products will depend on the organic contaminant entering the system as well as system parameters in the plasma reactor. The organic compound dissociation product can for example comprise at least one selected from the group consisting of methanol, ethanol, propanol, ethanal, propanal, formic acid, acetic acid, propanoic acid, butanoic acid, pentanoic acid, glycolic acid, oxalic acid, methoxyacetic acid, and formic acid. Organic compound dissociation products from the plasma reactor are discussed in *Oxidized Derivatives of n-Hexane from a Water/Argon Continuous Flow Electrical Discharge Plasma Reactor*, Bresch et al., Plasma Chemistry and Plasma Processing, 35(6) (2015) 553-584; *Analysis of a gas-liquid film plasma reactor for organic compound oxidation*, Hsieh et al., Journal of Hazardous Materials 317 (2016) 188-197; and *Analysis of hydroxyl radical formation in a gas-liquid electrical discharge plasma reactor utilizing liquid and gaseous radical scavengers*, Hsieh et al., Plasma Processes and Polymers, 14(8) e1600171 (2017); The disclosures of these references is hereby incorporated by reference.

Systems according to the invention can take different forms. There is shown in FIG. 1 an exemplary system 50 according to the invention. A gas/liquid input stream 51 includes at least one organic compound to be degraded. A gas-liquid separator 54 divides the input stream 51 into liquid stream 56 and gas streams 62. The liquid stream 56 passes through line 60 which includes a suitable control valve 166. Liquid then passes through input line 68 to an air-water plasma reactor 72. The gas stream 62 communicates through line 69 with a gas control valve 73 and through a line 75 to input line 68 to the air-water plasma reactor 72. Products from the air-water plasma reactor 72 exit through output line 80 and enter gas-liquid separator 88. Liquid leaves the gas-liquid separator 88 through line 96 connecting to line 104 and exits the plasma reactor system through line 112. Gas exits the gas-liquid separator 88 through line 116 and passes through a suitable control valve 134 to a line 124. A pump 136 returns the gas through line 144 and line 75 to the input line 68 into the air-water plasma reactor 72. A feedback control signal line 150 passes through line 158 to control valve 166 and through signal line 174 to control valve 73. In this manner, the flow of liquid through line 56 and gas through line 62 and line 69 to the air-water plasma reactor 72 can be controlled based upon conditions in the rest of the system and particularly the bioreactor.

The system 50 includes a second plasma reactor system that can be used for additional throughput of the input gas/liquid input stream 51. An alternative gas input line 58 can supply an alternative gas stream, for example argon, and thereby control the amount of nitrogen oxide compounds that are sent to the bioreactor or to control the amount of hydrogen peroxide that is produced. Nitrogen oxides, hydrogen peroxide and hydroxyl radicals will be produced in the plasma reactor that is supplied with nitrogen and oxygen sources, and only hydrogen peroxide and hydroxyl radicals will be produced in the plasma reactor which receives argon gas and no nitrogen. The two plasma reactors can be controlled to adjust the relative production rates of nitrates and hydrogen peroxide that are delivered to the bioreactor. While hydroxyl radicals are produced in both plasma reactors, the lifetime of the hydroxyl radicals is short and they do not transfer in significant quantity to the bioreactor. Gas flow through the input line 58 can be controlled by valve 71 and through path 77 and input line 74 can enter the gas-liquid plasma reactor 76. Liquid from the gas-liquid separator 54 flows through path 56 and line 64 to the input line 74 to the argon-water plasma reactor 76. Products from the argon-water plasma reactor 76 flow through output line 84 to a gas-liquid separator 92. Liquid flows through line 100 and line 108 to exit the plasma reactor system through line 112. Gas exits the gas-liquid separator 92 through line 139 and through a suitable control valve 137 to a line 128. A pump 132 returns the gas through a line 140 and line 77 into input line 74 to the argon-water plasma reactor 76. The feedback control signal line 150 passes through signal line 154 to control valve 162 and through signal line 170 to control valve 71. In this manner, the flow of liquid through line 64 and gas through line 58 and input line 74 into the argon-water plasma reactor 72 can be controlled based upon conditions in the rest of the system and particularly the bioreactor.

Figure 1B:
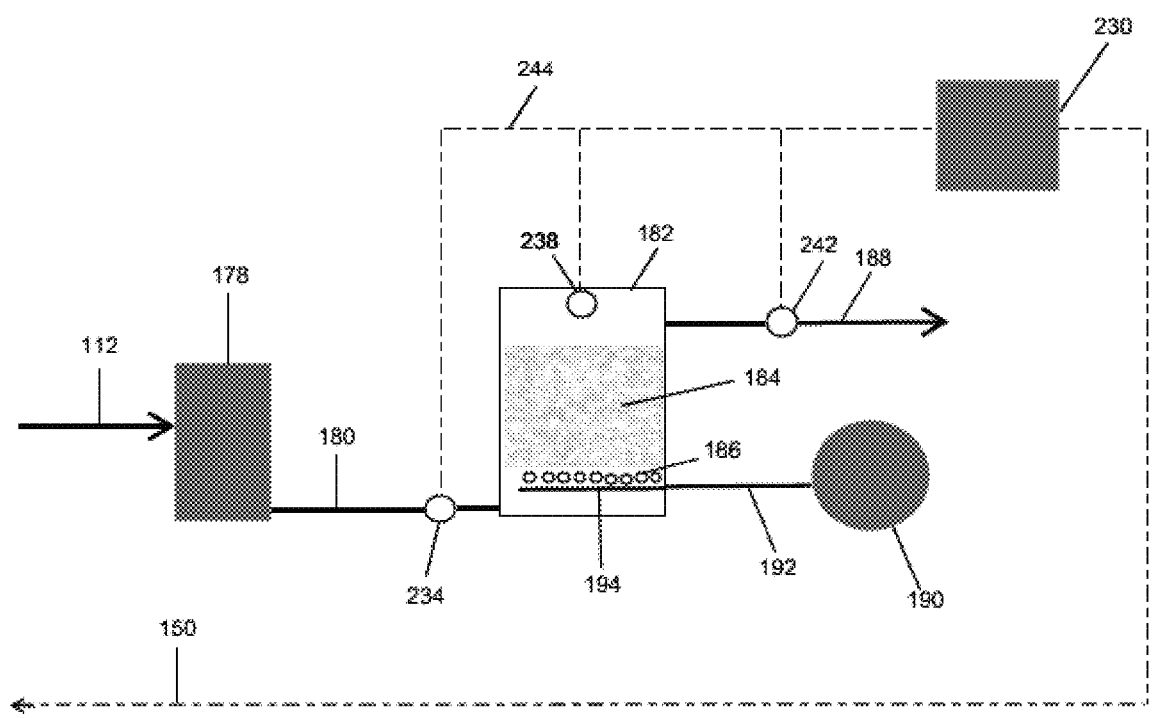
FIG. 1B is a schematic diagram of a second part of the process.

FIG. 1B shows a second part of the system in which the line 112 exiting the plasma reactor system directs liquid to a post plasma reactor 178. There the hydrogen peroxide concentration is reduced. Liquid leaves the post plasma reactor 178 through a line 180 and enters the biological reactor 182. The biological reactor 182 includes porous material 184 such as activated carbon supporting the biological organisms. A nutrient gas such as oxygen or air can be supplied from an appropriate source 190 and can be provided to the bioreactor 182 through a line 192 and gas distribution device or bubbler 194. Liquid and gas products leave the bioreactor through a line 188. A feedback control processor 230 can be provided. The feedback control processor 230 can communicate through signal line 244 with detector 234 in the line 180, detector 238 in the bioreactor 182 and detector 242 in the line 188. Other detectors are possible. The processor 230 processes the information and generates one or more control signals and returns these signals through one or more feedback control signal lines 150.

Figure 2:
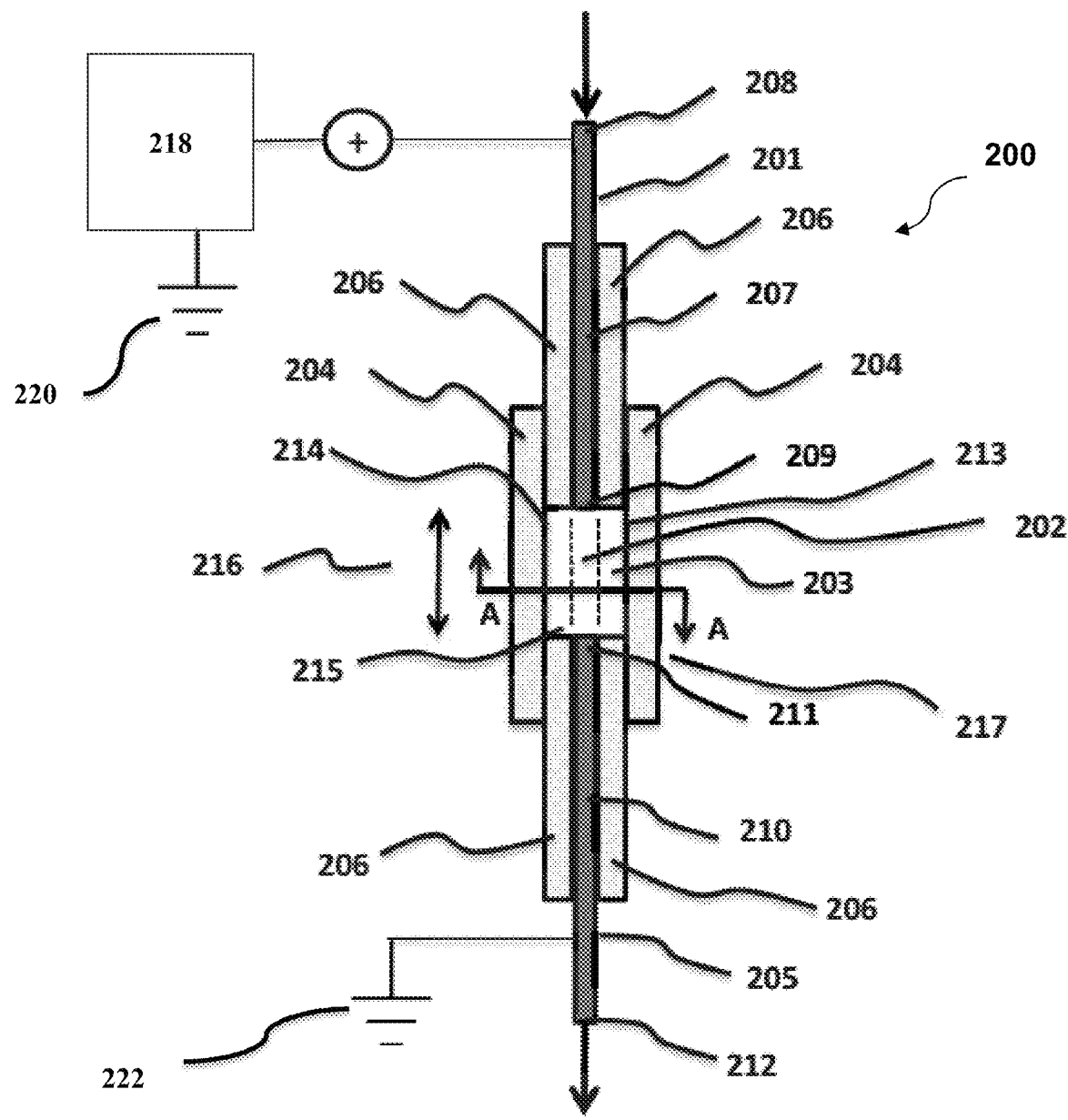
FIG. 2 is a schematic diagram of a combined liquid/gas plasma reactor.

FIG. 2 shows an illustration of a vertical cross section of a single plasma reactor 200, enclosed in a casing 204. The casing 204 may be cylindrical, or any suitable shape. The plasma reactor 200 can include a body portion 217 having one or more internal walls 213, 214 that define an internal cavity 215. For a tubular geometry internal walls 213 and 214 may be the same wall. According to various embodiments, and as shown in FIG. 2, the body portion 217 may be cylindrical. Other geometric shapes are possible.

The plasma reactor 200 can include at least one electrically-conductive inlet capillary 201 having an inlet capillary body 207 extending between a fluid-receiving tip 208 and a fluid-injecting tip 209. The fluid-receiving tip 208 is positioned outside the internal cavity 215, and the fluid-injecting tip 209 is positioned inside the internal cavity 215.

The plasma reactor can include at least one electrically-conductive outlet capillary 205 having an outlet capillary body 210 extending between a fluid-collecting tip 211 and a fluid-ejecting tip 212. The fluid-collecting tip 211 is positioned inside the internal cavity 215, and the fluid-ejecting tip 212 is positioned outside the internal cavity 215.

The electrically-conductive inlet capillary 201 and the electrically-conductive outlet capillary 205 can be made of any electrically conductive material, for example, according to one particularly preferred embodiment the electrically-conductive inlet capillary 201 and the electrically-conductive outlet capillary 205 can be made of 316 stainless steel capillary tubing with an outer diameter (O.D.) of 1.59 mm. Other electrically-conductive materials, as described herein can also be employed. The capillaries can also be any shape, but are preferably cylindrical.

The fluid injecting tip 209 can be disposed relative to the fluid collecting tip 211 to generate a flowing liquid film region 203 on the one or more internal walls 213, 214 and a gas stream or a gas flow region 202 flowing through the flowing liquid film region 203, when a fluid is injected into the internal cavity 215 via the at least one electrically conductive inlet capillary 201. The fluid injecting tip 209 can be disposed relative to the fluid collecting tip 211 to propagate a plasma discharge along the flowing liquid film region 203 between the at least one electrically-conductive inlet capillary 201 and the at least one electrically-conductive outlet capillary 205. According to various embodiments, the fluid injecting tip 209 can be aligned with the fluid collecting tip 211.

According to particularly preferred embodiments, the internal walls 213, 214 can be defined by the inner walls of the casing 204. As discussed above, the casing 204 can take a variety of geometrical forms. The casing 204 can also be made of a variety of materials, including but not limited to glass materials, plastic materials, and crystalline materials. Some exemplary material include, glass, polytetrafluoroethylene, polyethylene terephthalate, and fused quartz. Fused quartz or fused silica is glass consisting of silica in amorphous (non-crystalline) form.

Fused silica is particularly preferred, at least in part, because it provides a wide transparency range, a low electrical conductivity, a high melting point, a high thermal conductivity, and a low thermal expansion coefficient. Generally, the higher the thermal expansion coefficient and the lower the thermal conductivity, the more sensitive the substance is to quick changes in temperature. The extremely low coefficient of thermal expansion of fused quartz, i.e., about 5.5×10−7/° C. (20-320° C.), accounts, at least in part, for its remarkable ability to undergo large, rapid temperature changes without cracking.

According to certain embodiments, the casing 204 may be a substantially optically transparent material. Differing degrees of optical transparency are possible. As used herein, "optically transparent" refers to a material or layer that transmits rays of visible light in such a way that the human eye may see through the material distinctly. One definition of optically transparent is a maximum of 50% attenuation at a wavelength of 550 nm (green light) for a material or layer, e.g., a layer 1 μm thick. Another definition can be based on the Strehl Ratio, which ranges from 0 to 1, with 1 being a perfectly transparent material. Exemplary optically transparent materials can have a Strehl Ratio≥0.5, or a Strehl Ratio≥0.6, or a Strehl Ratio≥0.7, or a Strehl Ratio≥0.8, or a Strehl Ratio≥0.9, or a Strehl Ratio≥0.95, or a Strehl Ratio≥0.975, or a Strehl Ratio≥0.99.

The casing 204 may have an electrical conductivity within a range having a lower limit and/or an upper limit. The range can include or exclude the lower limit and/or the upper limit. The lower limit and/or upper limit can be selected from about $10^{-11}$, about $10^{-12}$, about $10^{-13}$, about $10^{-14}$, about $10^{-15}$, about $10^{-16}$, about $10^{-17}$, about $10^{-18}$, about $10^{-19}$, about $10^{-20}$, about $10^{-21}$, about $10^{-22}$, about $10^{-23}$, about $10^{-24}$, and about $10^{-25}$ Siemens/meter. For example, according to certain preferred embodiments, the casing 204 may have an electrical conductivity in a range of from about $10^{-11}$ to about $10^{-25}$ Siemens/meter. Other materials having similar electrical conductivities may also be employed. A casing 204 comprising glass may have an electrical conductivity in a range of from about $10^{-11}$ to about $10^{-15}$ S/m. A casing 204 comprising polytetrafluorethylene may have an electrical conductivity in a range of from about $10^{-25}$ to about $10^{-23}$ Siemens/meter. A casing 204 comprising polyethylene terephthalate will generally have an electrical conductivity on the order of $10^{-21}$ Siemens/meter.

The casing 204 may have a melting point within a range having a lower limit and/or an upper limit. The range can include or exclude the lower limit and/or the upper limit. The lower limit and/or upper limit can be selected from about 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, and 1600 degrees Celsius. For example, according to certain preferred embodiments, the casing 204 may have a melting point in a range of from about 300 degrees Celsius to over 1600 degrees Celsius. Other materials having similar melting points may also be employed. A casing comprising polytetrafluorethylene, for example, may have a melting point of about 327 degrees Celsius. A casing comprising glass may have a melting point of about 1500 degrees Celsius. A casing comprising fused quartz may have a melting point of about 1600 degrees Celsius.

The casing 204 may have a thermal conductivity within a range having a lower limit and/or an upper limit. The range can include or exclude the lower limit and/or the upper limit. The lower limit and/or upper limit can be selected from about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, and 5 W/m-K. For example, according to certain preferred embodiments, the casing 204 may have a thermal conductivity of from about 0.1 to about 5.0 W/m-K. Other materials with similar thermal conductivities may be employed. A casing comprising glass may have a thermal conductivity of from about 0.5 to about 1.0 W/m-K. A casing comprising fused quartz may have a thermal conductivity of about 1.3 W/m-K.

The casing 204 may have a thermal expansion coefficient within a range having a lower limit and/or an upper limit. The range can include or exclude the lower limit and/or the upper limit. The lower limit and/or upper limit can be selected from about $10^{-7}$, about $10^{-6}$, and about $10^{-5}$ per degree Celsius. For example, according to certain preferred embodiments, the casing 204 may have a thermal expansion coefficient of from about $10^{-7}$ to about $10^{-5}$ per degree Celsius. Other materials having similar thermal expansion coefficients may be employed. A casing comprising fused quartz may have a thermal expansion coefficient of about $5.5 \times 10^{-7}$ per degree Celsius. A casing comprising polytetrafluoroethylene may have a thermal expansion coefficient of about $1.35 \times 10^{-5}$ per degree Celsius.

As illustrated in FIG. 2, the casing 204 may be a piece of fused quartz tubing with an I.D. of 3.0 mm (AdValue Technology), which can serve as a viewing port for emission spectroscopy and high speed imaging. According to other particularly preferred embodiments, the electrically-conductive inlet capillary 201 and the electrically-conductive outlet capillary 205 can be incased by fused quartz tubing spacers 206 with an I.D. of 1.6 mm (AdValue Technology); the tubing 206 can be positioned such that the ends of the stainless steel and quartz tube spacers are flush at the entrance and exit of the discharge region, i.e. the internal cavity 215. These inlet and outlet assemblies comprising the electrically-conductive inlet capillary 201 and the electrically-conductive outlet capillary 205 incased by fused quartz tubing spacers 206 can then inserted into either end of the tubing 204.

The fluid injecting tip 209 and the fluid collecting tip 211 (or when employed, the respective ends of the inlet and outlet assemblies) can be positioned such that a gap 216 having a length. The gap 216 can have a length within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9, 20, 20.1, 20.2, 20.3, 20.4, 20.5, 20.6, 20.7, 20.8, 20.9, 21, 21.1, 21.2, 21.3, 21.4, 21.5, 21.6, 21.7, 21.8, 21.9, 22, 22.1, 22.2, 22.3, 22.4, 22.5, 22.6, 22.7, 22.8, 22.9, 23, 23.1, 23.2, 23.3, 23.4, 23.5, 23.6, 23.7, 23.8, 23.9, 24, 24.1, 24.2, 24.3, 24.4, 24.5, 24.6, 24.7, 24.8, 24.9, and 25 mm. For example, according to certain preferred embodiments, the gap 216 can have a length of about 4 mm.

The system includes a power supply coupled to a pulse forming network, 218, supplying a voltage across the at least one electrically-conductive inlet capillary and the at least one electrically-conductive outlet capillary. The pulse forming network 218 provides a high voltage pulse sufficient to produce a plasma channel between the at least one electrically-conductive inlet capillary 201 and the at least one electrically-conductive outlet capillary 205. The power network 218 can be connected to a suitable ground 220. As illustrated in FIG. 2, the pulse forming network 218 is electrically connected to the at least one electrically-conductive inlet capillary 201, while the at least one electrically-conductive outlet capillary 205 is grounded. The opposite arrangement is also possible, wherein the positive lead 218 is electrically connected to the at least one electrically-conductive outlet capillary 205, while the at least one electrically-conductive inlet capillary 201 is grounded. Alternatively, instead of a ground on either electrode, both positive polarity and negative polarity leads can be connected to either electrode (floating system).

A gap 216 separates the at least one electrically-conductive inlet capillary 201 and the at least one electrically-conductive outlet capillary 205. A ratio of the voltage supplied, i.e., the input voltage, by the power source 218 to the length of the gap 216 can be within a range having a lower limit and/or an upper limit. The range can include or exclude the lower limit and/or the upper limit. The applied voltage of the pulse should be sufficient to generate an electric field sufficient to produce the electrical breakdown and discharge plasma formation.

According to certain embodiments, a combination of a gap of from about 1 to about 10 mm and a pulsed input voltage ranging from about 8 to about 20 kV, can provide an average current of about 2-5 A with peaks from 10-15 A. The pulse forming network in the power supply may transform the supply voltage to the power supply to a much higher voltage in order to generate the electric fields mentioned above. Varying the output pulse voltage between 8 and 20 kV, supplied to such embodiments, did not have a significant impact on the average breakdown voltage, but did increase the current and total power. This is because variation in the voltage of the applied pulse does not significantly change the electric field needed to create the plasma by electrical breakdown.

The high voltage pulse may have a frequency within a range having a lower limit and/or an upper limit. The lower limit and/or upper limit can be selected from about 1 to about 100,000 Hz, or from 10,000 to 50,000 Hz. The pulse may have a width of from about 5 nanoseconds (ns) to about 1 ms. The pulse width determines the duration of arc and in some cases the number of arcing events per pulse. Faster rise times of the voltage pulse allow for efficient operation in high conductivity solutions. Contaminated water sources can have such a high solution conductivity. The power supply used in some experiments was a variable pulse power supply model NSP-120-20F commercially available from Eagle Harbor LLC. (Seattle Wash.), with the capability to independently vary the output pulse width (20-260 ns), output pulse voltage (0.2-20 kV), and pulse frequency (single—10 kHz).

According to various embodiments the high voltage pulse supplied by the pulse forming network 218 may be brought to a sufficient level to initiate breakdown of the gas and to produce a discharge channel (arc or streamer).

The reaction within the reactor may be subject to the discharge channel or arc, which can be optimized/controlled by changing the pulse properties which alter the characteristics of the plasma discharge. The pulse voltage is of a high enough potential to overcome the separation between the electrodes causing an electrical discharge or arc. This arcing happens while a fluid (gas and liquid) passes between the contacts. Chemical reactions occur in and near the plasma discharge or arc. The desired product output is partly dependent on the pulse frequency and duration (pulse width) of the arc and the flow, composition, and rate of the input reactants. To better control this reaction, characteristics of the applied pulse can be manipulated by the pulse forming network. The number of reactors in a set and the number of sets used for the desired scale needed are all problem specific and can be varied as needed. The specific power supply for the larger unit will depend upon the scale required.

According to various embodiments, the body portion 217 can be cylindrical. The cylindrical body portion 217 can have a first diameter within a range having a lower limit and/or an upper limit. The range can include or exclude the lower limit and/or the upper limit. The lower limit and/or upper limit can be selected from 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, 1.7, 1.71, 1.72, 1.73, 1.74, 1.75, 1.76, 1.77, 1.78, 1.79, 1.8, 1.81, 1.82, 1.83, 1.84, 1.85, 1.86, 1.87, 1.88, 1.89, 1.9, 1.91, 1.92, 1.93, 1.94, 1.95, 1.96, 1.97, 1.98, 1.99, and 2 cm. For example, according to certain preferred embodiments, the cylindrical body portion 217 can have a first diameter 0.1 to 1 cm. The at least one electrically-conductive inlet capillary can have a second diameter that is less than the first diameter. The at least one electrically-conductive outlet capillary can have a third diameter that is greater than the second diameter and less than the first diameter.

Figure 3:
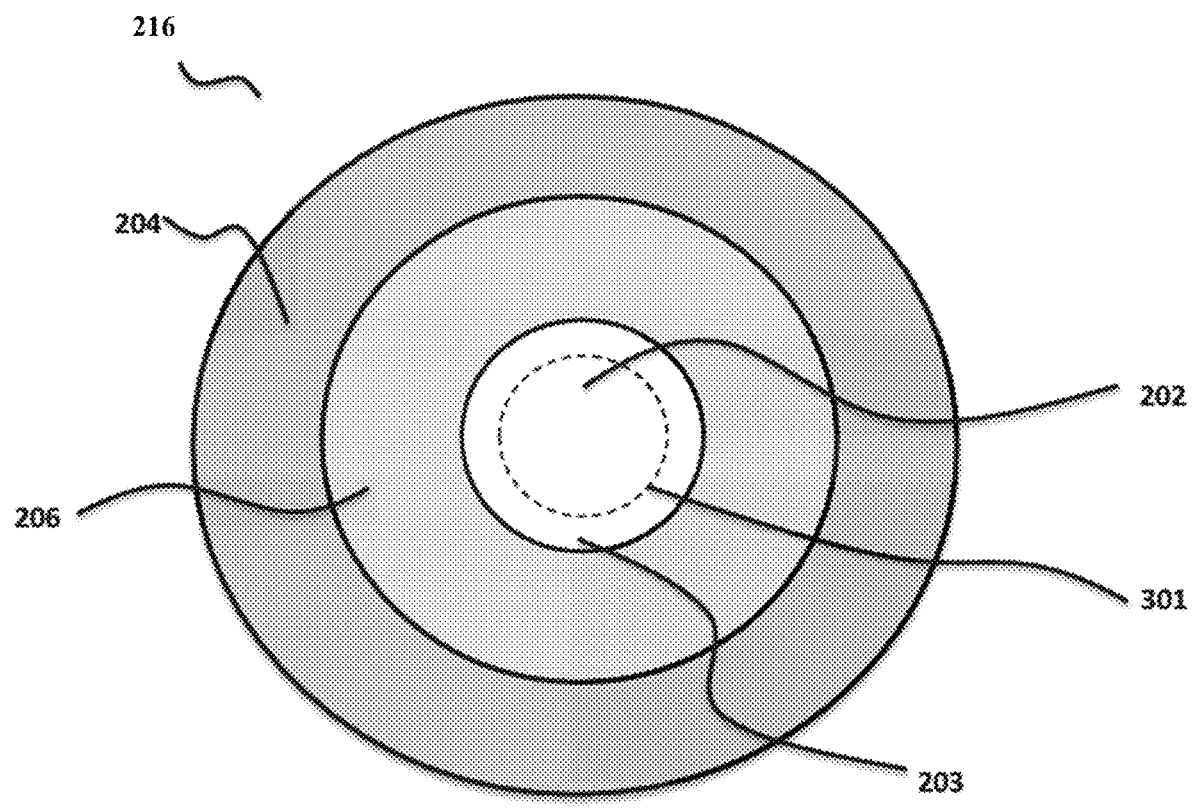
FIG. 3 is a cross section taken along line A-A in FIG. 2.

FIG. 3 shows an illustration of a radial cross section along line A-A as shown in FIG. 2 of the plasma reactor 200, i.e. the discharge region, according to various embodiments. The gas flow region 202 can be bounded by the gas/liquid interface 301, separating the gas flow and plasma discharge region 202 from the liquid film flow region 203. As discussed under FIG. 2, the liquid film flow region 203 flows along the casing 204, which may acts as the reactor wall.

According to various embodiments, the gas flow can be determined by the nozzle, i.e. the outlet of a capillary, diameter and the pressure. The liquid flow can be determined by the gas flow, and all other dependent properties can thereafter be determined. The maximum liquid flow can be determined by the gas flow, and all other dependent properties can thereafter be determined. The pressure of the inlet gas can be in the range of 10 to 500 pounds per square inch (psi). For an inlet gas pressure of 60 psi and a 0.01 inch inlet capillary nozzle with a 3 mm tube, the gas flow is 0.3 liters per minute and the upper liquid flow can be 4 ml/min. In addition to scaling up this process by placing many single reactors in parallel, alternative geometries could be used which utilize a single large volume chamber for the flow of water and gas in conjunction with multiple inlet and outlet nozzles into and out of the single chamber.

The invention can be utilized on site or in locations remote from the water supply. The invention can be made portable and either delivered to a site or housed in a truck or other vehicle that is moved to the site.

EXAMPLE

This invention involves the utilization of a gas-liquid plasma reactor to partially degrade organic compounds from gases and liquids and a following bioreactor to completely degrade the organic compounds into mineralized products. The plasma reactor converts the organic compounds into biodegradable components by the plasma induced chemical reactions with hydroxyl radicals and other species, followed by the bioreactor to degrade these products into mineralized compounds. The plasma energy costs may be too high for complete mineralization and some compounds formed are not readily degraded by the plasma. The bioreactor may not often be efficient in degrading toxic organic compounds and in the example used here, 1,4-dioxane cannot be readily degraded by the bioreactor. The plasma reactor was shown to be able to degrade 1,4-dioxane, but based upon total organic carbon analysis a range of intermediate products were formed that could not be further removed by the plasma. However, these intermediate products can be degraded by the bioreactor.

The combined gas-liquid plasma and bioreactor provides a synergistic improvement in the removal of the toxic organic compound through optimizing the plasma process to convert non-biodegradable compounds into biodegradable compounds and thereafter using the less expensive bioreactor for the final conversion to mineralized products. Compared to prior combined plasma reactors for treating liquids and bioreactors, the combined gas-liquid plasma reactor with bioreactor process has advantage when one or more of the contaminants are volatile, thus existing in both liquid and gas phases of the reactor.

One example application is treatment of groundwater contaminated by 1,4-dioxane, 1,1,1-trichloroethane (volatile), and trichloroethylene (volatile). Co-contamination of these three contaminants are very common. Water treatment plants are the end users.

Figure 4:
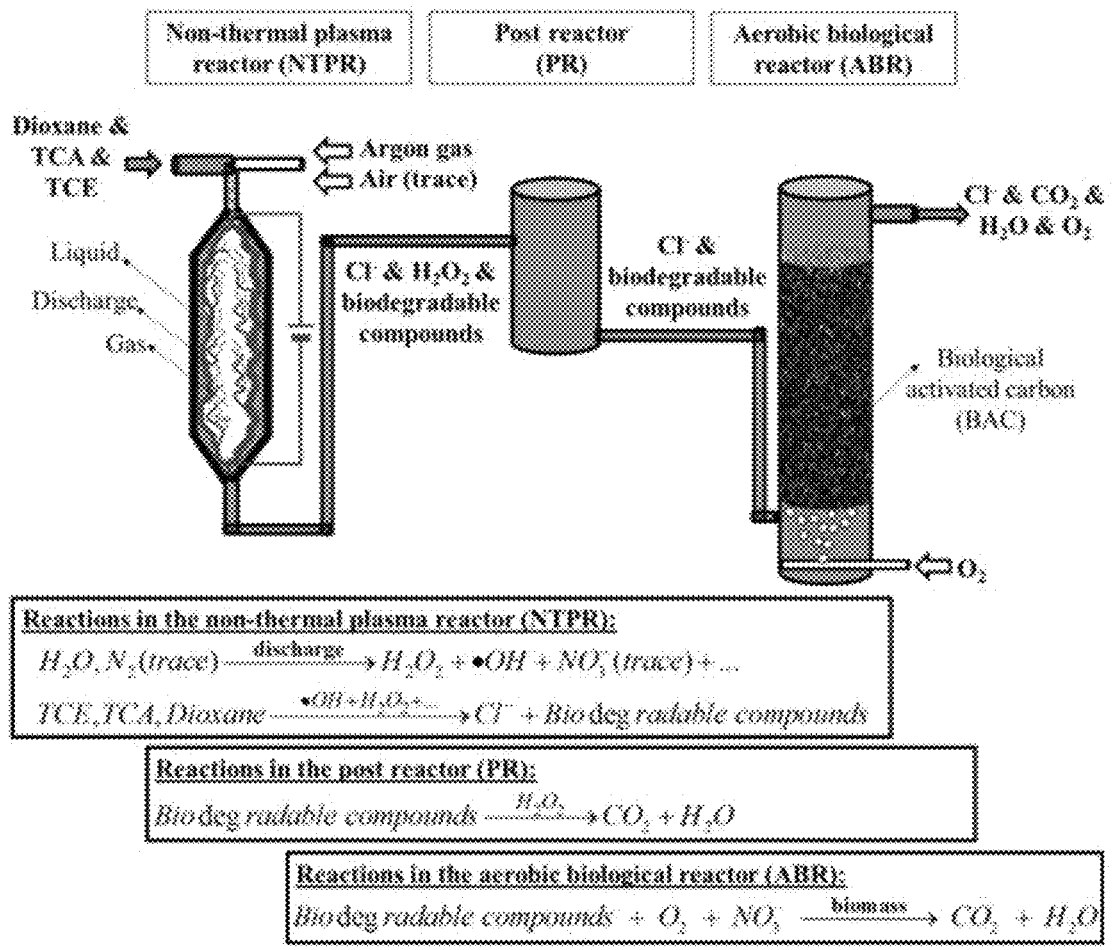
FIG. 4 is a schematic diagram of a process according to the invention for treating solutions containing 1,4 dioxane, with 1,1,1-trichloroethane (TCA) and/or trichloroethene (TCE)

To simultaneously remove dioxane, TCE, and TCA, the invention utilizes a non-thermal plasma reactor (NTPR) in the form of a gas-liquid plasma discharge reactor followed by a biological process (i.e., an aerobic biological reactor (ABR) in the form of a biological activated carbon reactor (BAC)) (FIG. 4). The hybrid liquid/gas discharge reactor converts dioxane, TCA, and TCE to more biodegradable intermediates, which are further removed in the following biological activated carbon reactor. A post plasma reactor is placed between the NTPR and the BAC to provide further reaction between $H_2O_2$ produced in the NTPR and the contaminants. Also, reduction of $H_2O_2$ eliminates or reduces its negative effect on microorganisms. The combined process saves significant treatment time compared to the sole biological reactor and significant energy compared to the sole non-thermal plasma reactor for dioxane treatment, and is effective in removing TCA.

Since most of the intermediates such as alcohols, ketones, aldehydes, and organic acids produced during the advanced oxidation of dioxane, TCE, and TCA are biodegradable, the biological reactor is used to further degrade the intermediates. The combined process saves significant energy compared to the sole advanced oxidation process (AOP) and significant treatment time compared to the sole biological process.

The gas-liquid plasma discharge reactor described in this application is a type of non-thermal plasma reactors and it has advantages compared with the more commonly used AOP such as $H_2O_2+UV$ and $H_2O_2+O_3$ which are not efficient in TCA removal. The gas-liquid plasma process provides a variety of mechanisms (i.e., hydroxyl and other radicals, ozonation, $H_2O_2$ oxidation) to oxidize TCA and it produces the chemical oxidants, including hydroxyl radicals and hydrogen peroxide, directly from water and gas supplied to the reactor. In addition, the gas-liquid plasma reactor produces nitrogen oxides (e.g., nitrate, $NO_3^-$) as nutrients for the following biological process. Most groundwater is oligotrophic in nature, meaning that it offers little nutrients to sustain microbial growth. Nitrogen is one of the major nutrients that microorganisms need. The non-thermal plasma reactor can fix nitrogen through the electrical conversion of nitrogen gas and oxygen gas or nitrogen gas and water to oxidized nitrogen compounds, which can serve as nitrogen sources for the microorganisms in the biological reactor.

The gas-liquid plasma discharge reactor of the invention is a type of non-thermal plasma reactor (NTPR) that is suitable for simultaneous removal of dioxane, TCA, and TCE. The dimensionless Henry's law constant of dioxane, TCA, and TCE are $2.0 \times 10^4$, 0.70, and 0.42, respectively, suggesting that dioxane is miscible, and TCA and TCE are volatile. The hybrid liquid/gas discharge reactor is very suitable since the discharge propagates along the interface between the water and the gas, producing highly reactive species and radicals in both the gas and liquid to simultaneously remove the three contaminants.

The liquid effluent from the non-thermal plasma reactor is collected in a post plasma reactor, which is a closed medium bottle connected to a plastic bag that contains an inert gas, argon, to maintain the pressure in the bottle at one atmosphere. An inert gas is used so that it will not affect the measurement of reaction products and intermediates.

Water in the post reaction tank is pumped to the bottom of a biological activated carbon reactor (BAC) using a peristaltic pump. Oxygen is supplied to the bottom of the BAC reactor by a fine-bubble diffuser. The BAC reactor will be operated as a fluidized bed reactor, with fluidization achieved through recirculation pumping. Effluent from the BAC column overflows to a collection bottle, which is closed by a plastic bag filled with argon to make sure the pressure is atmospheric.

The 1,4-dioxane and its organic breakdown products can be collectively measured as dissolved organic carbon (DOC, as in the experiment) or chemical oxygen demand (COD). COD is better than DOC for the N feedback control because there is a typical COD and N ratio for bacteria growth under aerobic condition: COD:N=100:5. This ratio is used to estimate relative flows to argon or air plasma reactors during the system design phase since the argon plasma reactor generates COD only, but the air plasma reactor generates both COD and nitrogen. During operation, both COD and the total nitrogen in the biological reactor effluent are monitored. If COD:N>100:5, more flow should go to the air plasma reactor. If COD:N<100:5, more flow should go to the argon plasma reactor. At the same time, effluent nitrate, nitrite, and COD should meet the drinking water standards.

The dioxane results show the degradation of a completely water soluble compound. Since dioxane is not volatile at all it remains in the liquid phase and reacts with hydroxyl radicals at the interface of the plasma with the liquid, and also in the liquid. Oxidation of chemical dyes, methylene blue, which are water soluble and not volatile is also possible.

Figure 5:
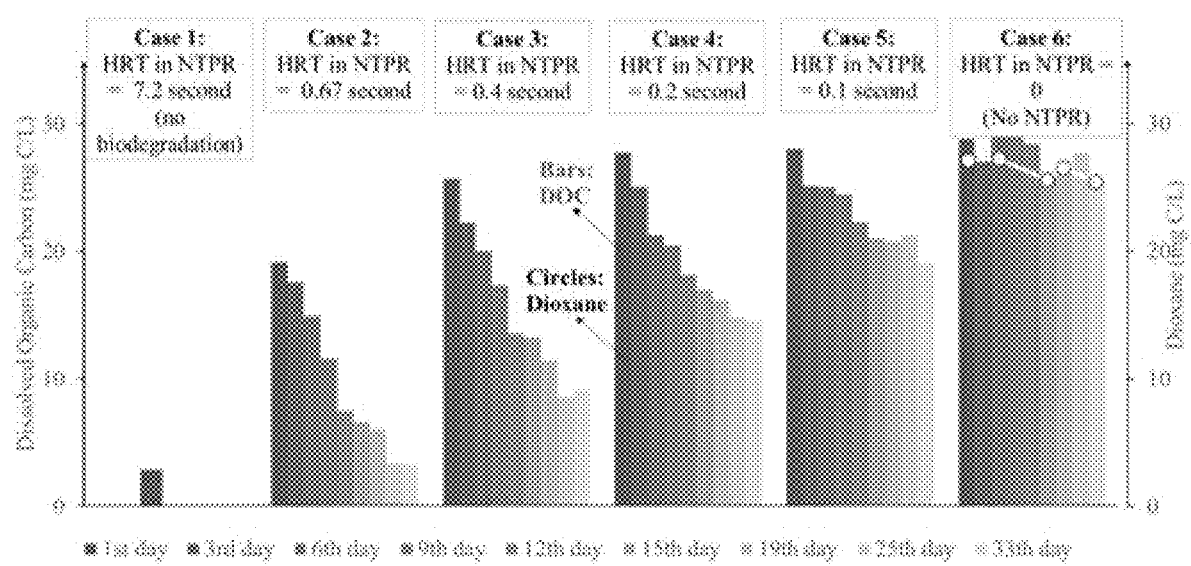
FIG. 5 is a plot of dissolved organic carbon (DOC) and dioxane concentration in the biological batch reactor containing dioxane-contaminated groundwater that was pre-treated by a non-thermal plasma reactor (NTPR) at six different hydraulic retention times (HRT).

A synthetic groundwater containing dioxane at ~30 mg C/L was pre-treated by a non-thermal plasma reactor (NTPR) at an argon retention time of $4 \times 10^{-4}$ second and the following key discharge conditions: input voltage of 20 kV, pulse frequency of 10 kHZ, and pulse width of 20 ns. Six cases were tested and they differed in the hydraulic retention time (HRT=7.2, 0.67, 0.4, 0.2, 0.1, 0 second) in the NTPR. The pretreated water was stored in a post reactor for two days to remove $H_2O_2$ to below 1 mg/L so that $H_2O_2$ did not affect the following biological degradation. The stored water was then transferred to a biological batch reactor that contained a microbial consortium that had shown dioxane-degrading capacity in a previous experiment. Dissolved organic carbon (DOC) and dioxane concentrations in the biological batch reactor were monitored and plotted in FIG. 5. FIG. 5 shows dissolved organic carbon (DOC) and dioxane concentrations in the biological batch reactor containing the dioxane-contaminated groundwater that was pretreated by the nonthermal plasma reactor at six different hydraulic retention times (HRT). To remove dioxane to below 1 mg C/L and intermediates (i.e., DOC) to below 4 mg C/L, the combined process (e.g., Case 2) needed a non-thermal plasma treatment time (i.e., HRT) of 0.8 second and a biological treatment time of 25 days. The sole non-thermal plasma process (Case 1) needed a treatment time of 7.2 second and the sole biological process (i.e., Case 6) needed a treatment time of much longer than 150 days.

Figure 6:
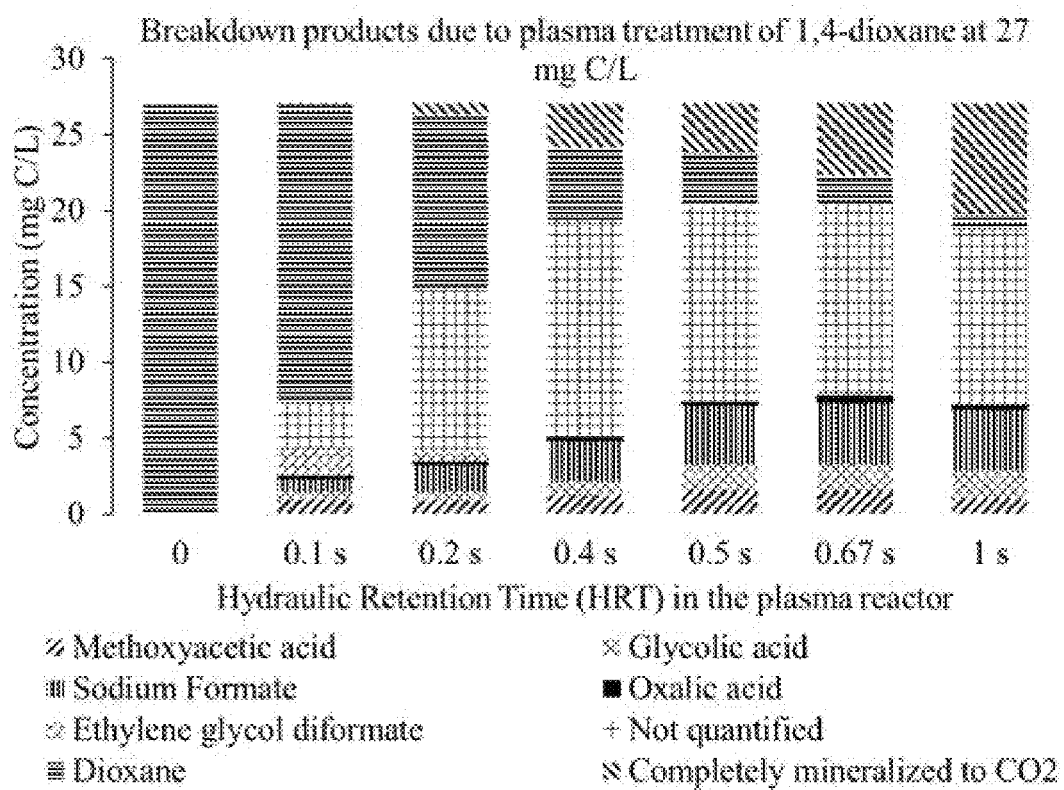
FIG. 6 is a chart of Concentration (mg C/L) versus hydraulic retention time (HRT) for breakdown products from the plasma reactor.

FIG. 6 shows the effect of hydraulic retention time in the plasma reactor on dioxane breakdown products. These results show that hydraulic retention time in the plasma reactor has a very significant effect on the organic compound dissociation products. The design hydraulic retention time should result in much higher 1,4-dioxane conversion to organic breakdown products (to promote the following biodegradation), but little conversion of the organic breakdown products to carbon dioxide (to minimize the energy use in the plasma reactor). In FIG. 6, 1 second is a good design hydraulic retention time for the plasma reactor. The invention monitors the presence of nitrogen and organic carbon through chemical oxygen demand, and controls the production of nitrogen oxides, hydrogen peroxide, and hydroxyl radicals based on the need for these compounds.

Figure 7:
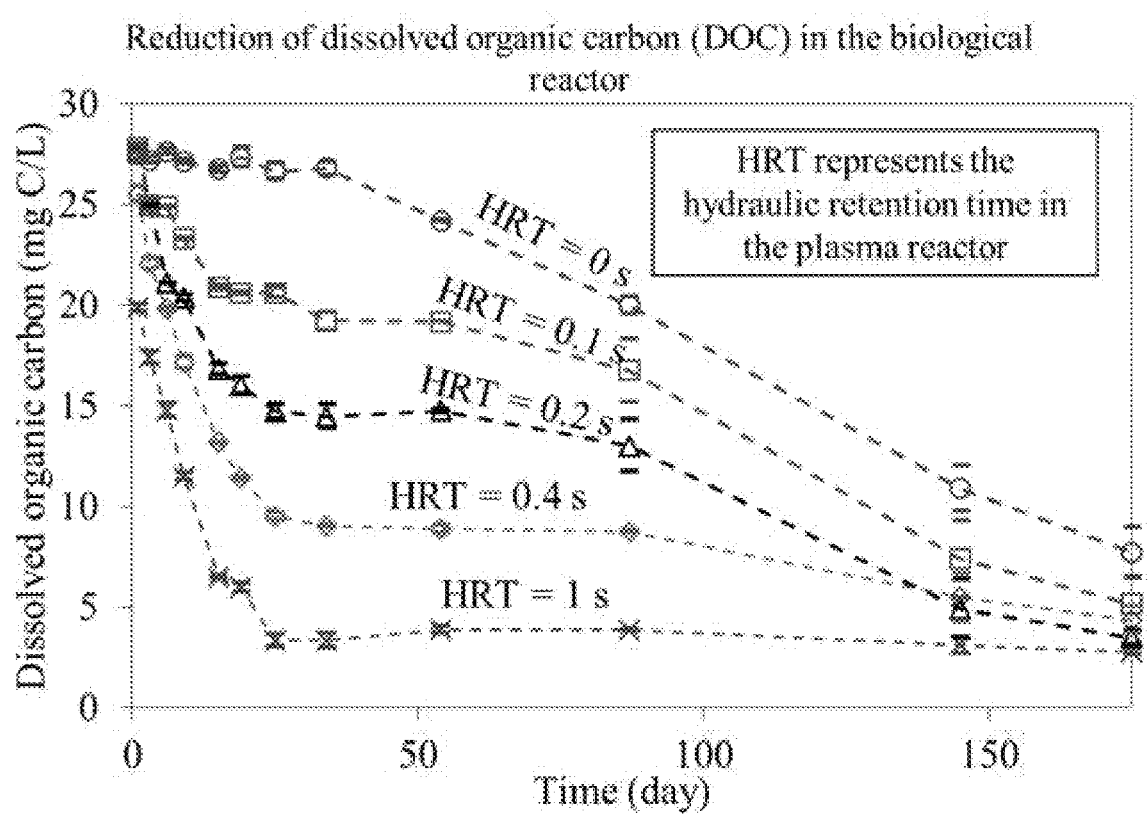
FIG. 7 is a plot of dissolved organic carbon (mg C/L) versus time for different hydraulic retention times (HRT).

FIG. 7 illustrates that 1, 4-dioxane and its organic breakdown products can be measured as dissolved organic carbon. It also illustrates the biodegradation of the dissolved organic carbon in the biological reactor. Under the design hydraulic retention time (1 second) in the plasma reactor, the biological reactor showed the fastest degradation of the dissolved organic carbon. This represents the maximum synergism between the plasma reactor and the biological reactor. An excessive breakdown of the organic compounds (for example to $CO_2$) in the plasma reactor will use more energy than is necessary, and the biological reactor will be underutilized.

Figure 8A:
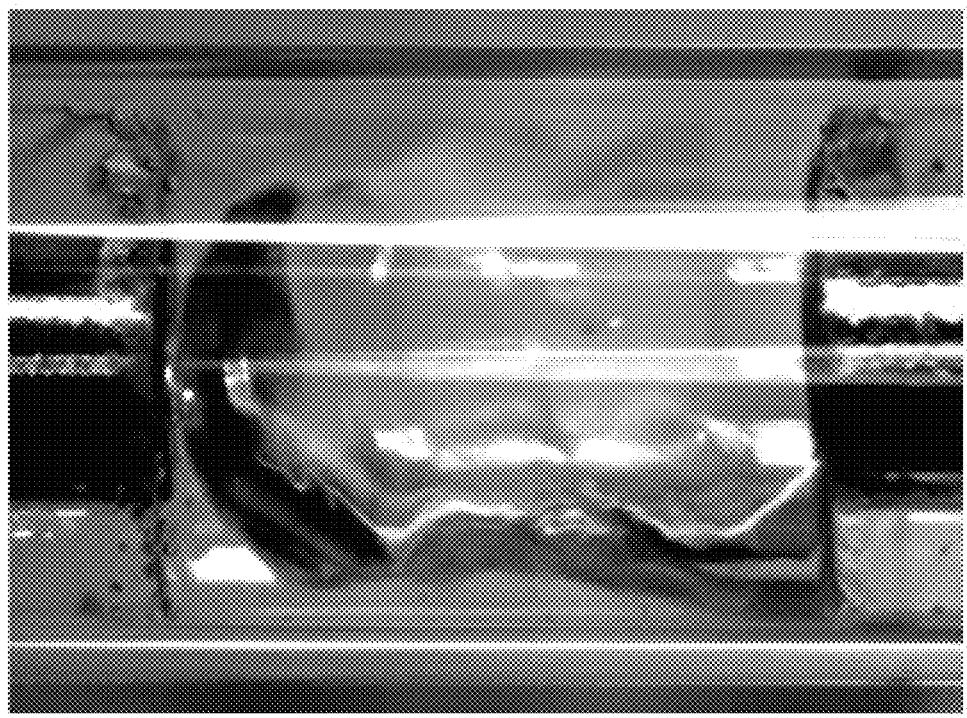
FIG. 8A is a depiction of a discharge channel along the interface of the gas and liquid.
Figure 8B:
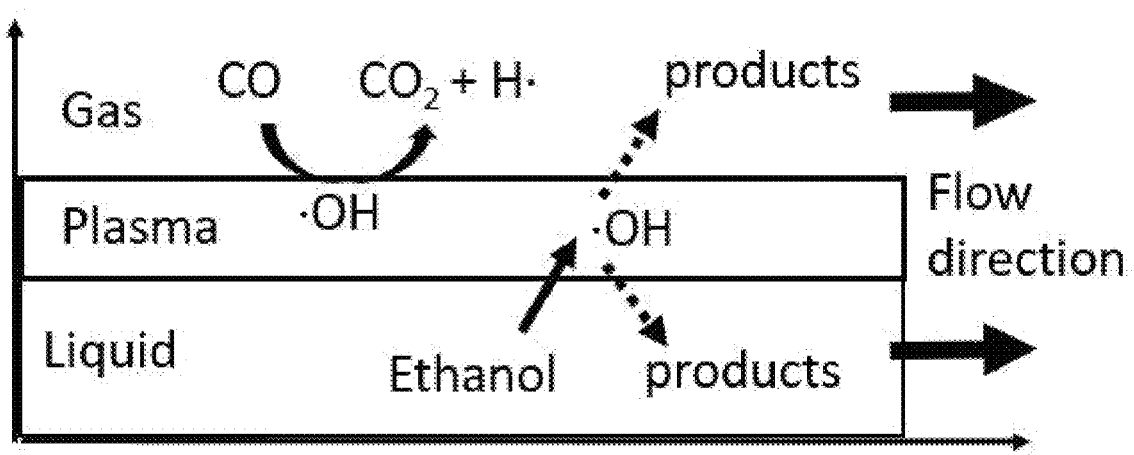
FIG. 8B is a schematic of major reaction processes with the gas and liquid probes for ethanol.

FIG. 8 show a photograph and schematic of the gas and liquid flows in the plasma reactor and where reactions occur in the plasma reactor processing ethanol and carbon monoxide as test compounds. This figure shows schematically that using the gas phase probe carbon monoxide, CO, can react in the gas phase of the plasma with hydroxyl radicals formed in the plasma to form $CO_2$. In addition, the figure shows schematically that the ethanol from the liquid phase reacts with hydroxyl radicals in the plasma to form products that are released either back into the liquid or into the gas. Since ethanol has some volatility as well, some ethanol will vaporize directly (this is further discussed in the article, but not critical for the idea).

Figure 9:
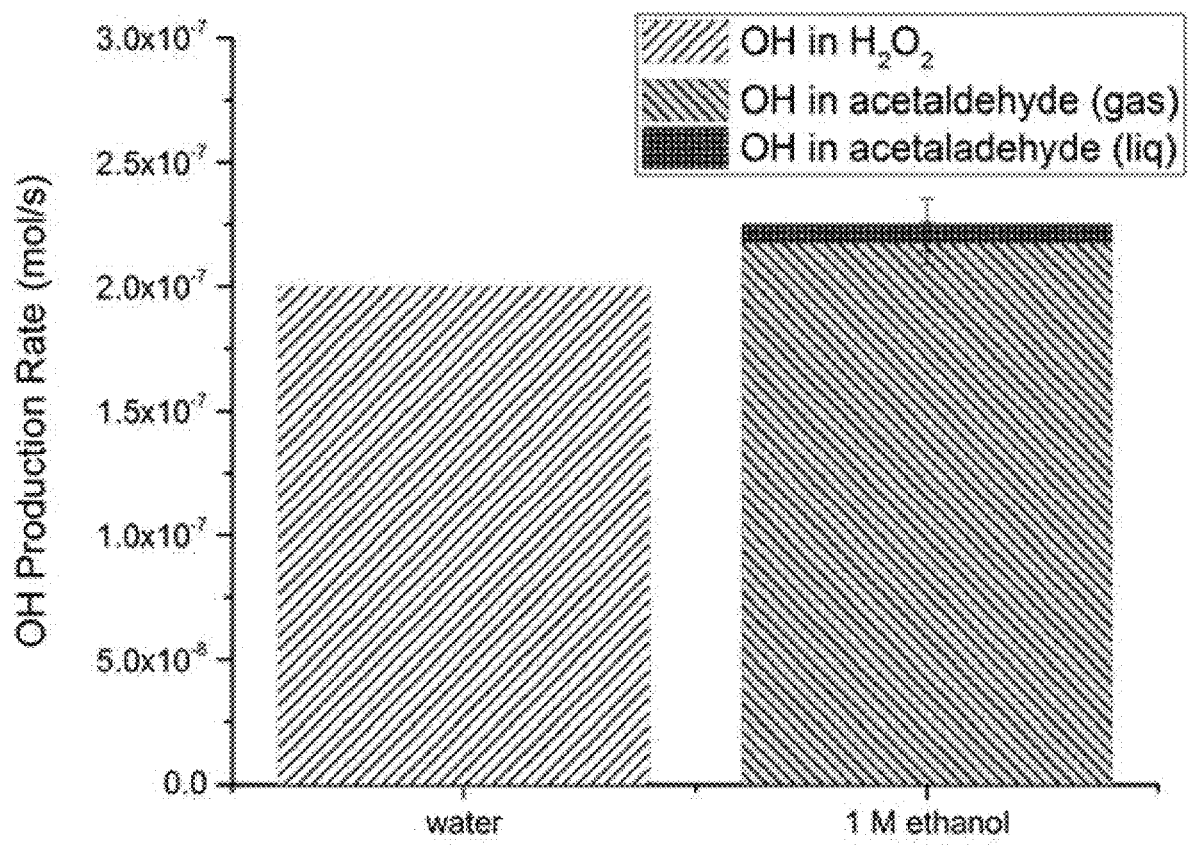
FIG. 9 is a plot of the total hydroxyl radical, (.OH) production rates versus ethanol concentration in water illustrating breakdown in the plasma reactor. The total .OH production rate was calibrated based on the pathway for the oxidation of ethanol to acetaldehyde.
Figure 10:
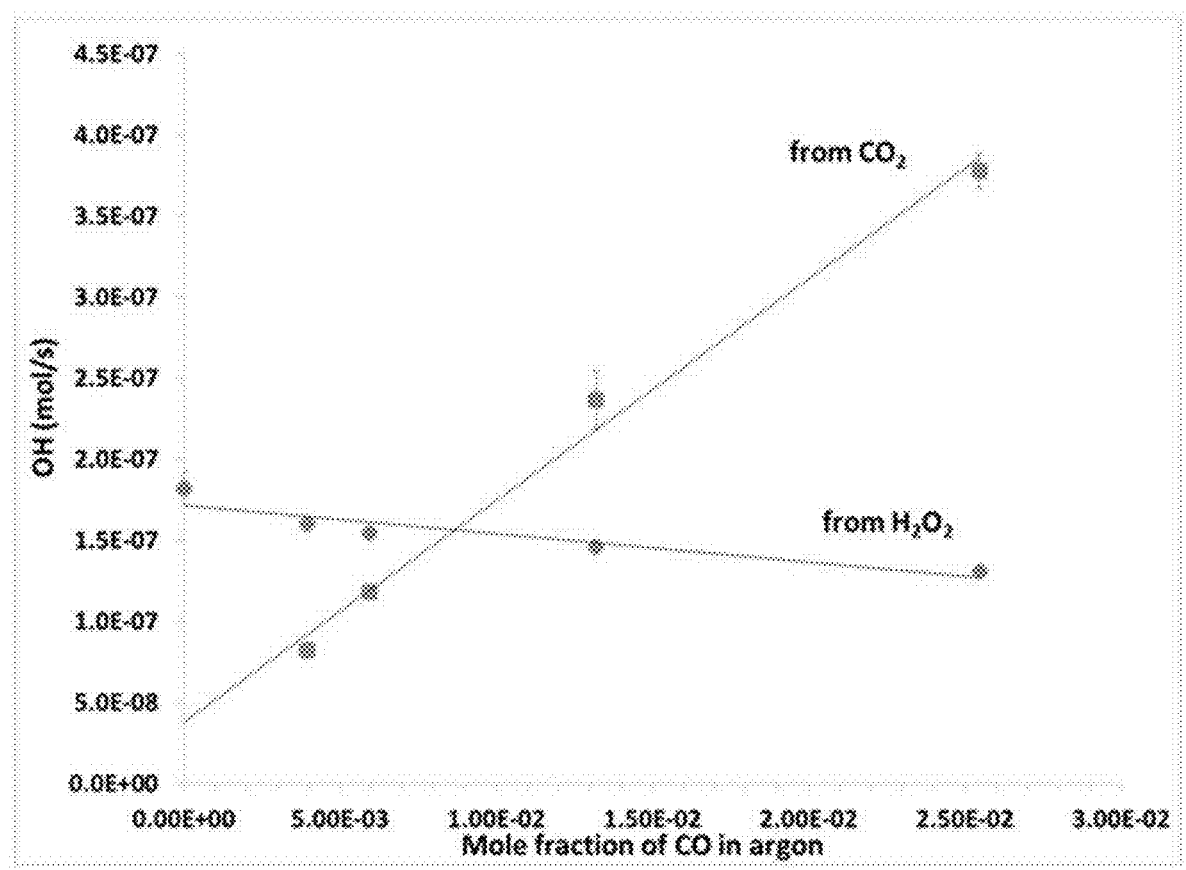
FIG. 10 is a plot of the total .OH production rates versus the mole fraction of carbon monoxide, CO, in the argon gas stream for the plasma reactor. The total .OH production rate was calculated based on the proposed oxidation pathway leading from CO to $CO_2$ and on the amount of $H_2O_2$ formed.

FIG. 9 shows the quantified measurements of the production of hydroxyl radicals as determined from $H_2O_2$ (measured in the liquid) and from the main product of ethanol oxidation, acetaldehyde, where ethanol was added to the liquid in the feed to the reactor. FIG. 9 illustrates the capability of the gas-liquid plasma reactor to oxidize species, e.g. ethanol, that exist in the liquid phase and that can partially transfer into the gas phase. FIG. 10 shows the quantified data for hydroxyl radical production as measured by CO oxidation. FIG. 10 demonstrates the capability of the gas-liquid plasma reactor to oxidize gas phase components as illustrated by the CO reaction to $CO_2$. Since CO has a relatively low solubility in water, its reaction, as shown in FIG. 8, is in the gas phase (where the gas phase contacts the plasma). As the proportion of CO in the gas phase increases, additional hydroxyl radicals are measured (further details on that are given in the paper, but are not critical, except that this leads to higher efficiency in hydroxyl radical generation since hydroxyl radical is not lost by reconversion back to $H_2O$). These results demonstrate that both gas and liquid phase contaminants can be effectively treated in the plasma reactor.

This invention can be embodied in other forms without departing from the spirit or essential attributes thereof, and accordingly reference should be made to the following claims to determine the scope of the invention.

We claim:

1. A method for degrading organic compounds, comprising the steps of:
    injecting a mixture comprising liquid water, a gas and at least one organic compound to contact at least one electrically-conductive inlet electrode of a continuously-flowing non-thermal gas-liquid plasma discharge reactor to generate a flowing liquid film region on one or more internal walls of the continuously-flowing non-thermal plasma reactor with a gas stream flowing alongside the flowing liquid film region;
    propagating a plasma discharge along the flowing liquid film region from the at least one electrically-conductive inlet electrode to at least one electrically-conductive outlet electrode at an opposing end of the continuously-flowing non-thermal gas-liquid plasma discharge reactor;
    dissociating water and nitrogen-containing gas in the plasma discharge to form a plurality of dissociation products, and producing hydroxyl radicals, hydrogen peroxide and nitrogen oxides from the plurality of dissociation products;
    transferring hydroxyl radicals, hydrogen peroxide and the nitrogen oxides into the flowing liquid film region and the flowing gas stream;
    contacting the hydroxyl radicals with the organic compound present in the flowing liquid film region and in the flowing gas stream to produce organic compound dissociation products;
    transferring at least some organic compound dissociation products and nitrogen oxides to a bioreactor;
    detecting nitrogen oxide concentration entering the bioreactor;
    determining the demand for nitrogen oxides in the bioreactor;
    controlling by a feedback loop the production of nitrogen oxides in the plasma reactor based upon the sensed nitrogen oxide concentration and the determined demand for nitrogen oxides entering the bioreactor; and,
    converting in the bioreactor at least some of the organic compound dissociation products into mineralized bioreactor products.

2. The method according to claim 1, wherein the at least one conductive inlet electrode and the at least one outlet electrode are capillary tube electrodes, and the plasma reactor is tubular.

3. The method of claim 2, wherein the electrically-conductive inlet capillary tube electrode has a first internal diameter, the tubular plasma reactor has a second internal diameter, and the electrically conductive outlet capillary tube electrode has a third internal diameter, the third internal diameter being larger than the first internal diameter and smaller than the second internal diameter.

4. The method according to claim 1, wherein the gas comprises at least one selected from the group consisting of a diatomic gas, a noble gas, and combinations thereof.

5. The method according to claim 1, wherein the gas is at least one selected from the group consisting of nitrogen gas, oxygen gas, air, and combinations thereof.

6. The method according to claim 4, wherein the noble gas is at least one selected from the group consisting of helium and argon, and combinations thereof.

7. The method according to claim 1, wherein the organic compound comprises 1,4-dioxane and at least one selected from the group consisting of trichloroethane (TCA) and trichloroethene (TCE).

8. The method according to claim 1, wherein the organic compound is at least one selected from the group consisting of an alkane, an alkene, an alkyne, an aromatic hydrocarbon, chlorinated hydrocarbons, and combinations thereof.

9. The method according to claim 8, wherein the alkane structure is at least one selected from the group consisting of linear, cyclic, branched, and combinations thereof.

10. The method according to claim 8, wherein the alkene structure is at least one selected from the group consisting of linear, cyclic, branched, and combinations thereof.

11. The method according to claim 8, wherein the alkane is a $C_1$-$C_{20}$ alkane.

12. The method according to claim 8, wherein the alkane is at least one selected from the group consisting of methane, ethane, propane, butane, hexane, octane, decane, icosane, isomers thereof, and combinations thereof.

13. The method according to claim 8, wherein the alkene is a $C_2$-$C_{20}$ alkene.

14. The method according to claim 8, wherein the alkene is at least one selected from the group consisting of ethylene, propylene, butane, pentene, hexenes, octenes, decenes, pentadecenes and combinations thereof.

15. The method according to claim 8, wherein the alkyne is a $C_2$-$C_{20}$ alkyne.

16. The method according to claim 8, wherein the aromatic hydrocarbon comprises from 6 to 20 carbon atoms.

17. The method according to claim 8, wherein the aromatic hydrocarbon is at least one selected from the group consisting of benzene, toluene, ethylbenzene, xylenes, cumene, biphenyl, naphthalene, anthracene, chlorinated organics, and combinations thereof.

18. The method according to claim 1, wherein the mixture is injected into a plurality of electrically-conductive inlet capillary tubes.

19. The method according to claim 1, wherein the flowing liquid film region has an annular shape.

20. The method according to claim 1, wherein plasma discharge has a frequency of from about 1 to 100,000 Hz.

21. The method according to claim 1, wherein the plasma discharge is created by a power supply providing a pulse width of from 5 ns to 1 ms.

22. The method of claim 1, further comprising the step of reducing the hydrogen peroxide concentration entering the bioreactor in a post plasma reactor.

23. The method of claim 1, wherein the feedback loop controls at least one selected from the group consisting of the flow rate of water, the flow rate of gas, the flow rate of organic compound, and the plasma discharge.

24. The method of claim 1, wherein the organic compound dissociation product comprises at least one selected from the group consisting of methanol, ethanol, propanol, ethanal, propanal, formic acid, acetic acid, propanoic acid, butanoic acid, pentanoic acid, glycolic acid, oxalic acid, methoxyacetic acid, and sodium formate.

25. The method of claim 1, wherein the controlling step comprises controlling at least one selected from the group consisting of gas flow rate, gas composition, gas and liquid residence times in the plasma reactor, applied pulse voltage, pulse width, pulse rise time, and pulse frequency in the plasma reactor.

26. The method of claim 1, further comprising at least two plasma reactors operating in parallel, and controlling each plasma reactor independently relative to the other plasma reactor.

27. The method of claim 26, wherein the gas injected into one of the plasma reactors comprises nitrogen, and the gas injected into the other of the plasma reactors comprises a noble gas and is without nitrogen, the method further comprising the step of controlling the plasma reactor receiving nitrogen to control nitrogen oxide production, while controlling the plasma reactor receiving the noble gas to control hydrogen peroxide production without nitrogen oxide production.

28. The method of claim 1, wherein the determining step comprises determining at least one selected from the group consisting of the chemical oxygen demand and the dissolved organic carbon in the bioreactor.

29. The method of claim 1, wherein the determining step comprises determining the ratio of chemical oxygen demand to total nitrogen in the bioreactor.

30. A reactor system, comprising:
a continuously-flowing non-thermal plasma reactor comprising at least one internal wall, at least one electrically-conductive inlet electrode at one end of the internal wall, and at least one electrically-conductive outlet electrode at an opposing end of the plasma reactor, the electrically-conductive inlet electrode being configured to inject a mixture comprising a liquid, a gas and at least one organic compound into the plasma reactor, the injecting of the liquid and gas generating a continuously flowing liquid film region on the internal wall, and a gas stream flowing along the flowing liquid film region, the injecting further propagating a plasma discharge channel pattern along the interface between the flowing liquid film region and the flowing gas stream inside the plasma reactor;
propagating the plasma discharge along the flowing liquid film region from the at least one electrically-conductive inlet electrode to the at least one electrically-conductive outlet electrode at an opposing end of the continuously-flowing plasma reactor;
a pulse forming network and power supply for supplying a voltage to cause electrical breakdown across the at least one electrically-conductive inlet electrode and the at least one electrically-conductive outlet electrode;
the reactor dissociating at least a portion of the liquid at the interface with the plasma discharge to form a plurality of dissociation products, and producing hydroxyl radicals, hydrogen peroxide and nitrogen oxides from the plurality of dissociation products, and contacting the hydroxyl radicals with the organic compounds present in the flowing liquid film region and in the flowing gas stream to produce organic compound dissociation products, and flowing the liquid, gas, plasma, dissociation products, and organic compound dissociation products to the electrically conductive outlet electrode;
a bioreactor for receiving the dissociation products and organic compound dissociation products and converting the organic compound dissociation products to bioreactor products;
a detector for detecting nitrogen oxide content in the bioreactor;
a nitrogen oxide demand system for determining nitrogen oxide demand in the bioreactor;
a feedback loop controller system for controlling the production of nitrogen oxides in the plasma reactor based upon the nitrogen oxide demand in the bioreactor and the nitrogen oxide content in the bioreactor.

31. The reactor system according to claim 30, wherein the electrically-conductive inlet electrode and the electrically-conductive outlet electrode are capillary tube electrodes, and the plasma reactor is tubular.

32. The reactor system according to claim 31, wherein the tubular plasma reactor has a first internal diameter, and wherein the at least one electrically-conductive inlet capillary tube electrode has a second diameter that is less than the first diameter, and wherein the at least one electrically-conductive outlet capillary tube electrode has a third diameter that is greater than the second diameter and less than the first diameter.

33. The reactor system according to claim 31, wherein the liquid water, gas and organic compound mixture exiting the inlet capillary tube electrode enters the plasma reactor as a radial spray and contacts the internal wall of the tubular plasma reactor to form a liquid film and a high velocity gas flow region in the plasma reactor.

34. The reactor system according to claim 30, wherein the power supply and pulse forming network is adapted to provide high voltage pulses sufficient for electrical breakdown of the gas between the at least one electrically-conductive inlet electrode and the at least one electrically-conductive outlet electrode.

35. The reactor system according to claim 30, wherein the power source provides a pulse width of from 5 ns to 1 ms.

36. The reactor system according to claim 30, wherein the plasma discharge is a pulsed discharge.

37. The reactor system of claim 30, further comprising a post plasma reactor for reducing the hydrogen peroxide concentration entering the bioreactor.

38. The reactor system of claim 30, wherein the bioreactor is an aerobic activated carbon bioreactor.

39. The reactor system of claim 30, wherein the feedback loop controller system controls at least one selected from the group consisting of the flow rate of water, the flow rate of gas, the flow rate of organic compound, gas composition, gas and liquid residence times in the plasma reactor, and the applied voltage, pulse width, pulse rise time, and pulse frequency in the plasma reactor.

40. The reactor system of claim 30, further comprising at least two plasma reactors operating in parallel, each plasma reactor being independently controllable relative to the other plasma reactor.

41. The reactor system of claim 40, wherein the gas injected into one of the plasma reactors comprises nitrogen, and the gas injected into the other of the plasma reactors comprises a noble gas and is without nitrogen, the feedback controller controlling the plasma reactor receiving nitrogen to control nitrogen oxide production, while controlling the plasma reactor receiving the noble gas to control hydrogen peroxide production.

42. The reactor system of claim 30, wherein the nitrogen oxide demand system comprises at least one selected from the group consisting of the chemical oxygen demand detector and a dissolved organic carbon detector.

43. The reactor system of claim 30, wherein the feedback loop controller system comprises a processor for determining the ratio of chemical oxygen demand to total nitrogen in the bioreactor, the processor having stored in memory a ratio set point for controlling the plasma reactor responsive to whether the ratio of chemical oxygen demand to total nitrogen in the bioreactor is above or below the set point.

* * * * *